(12) United States Patent
Nobori et al.

(10) Patent No.: US 8,213,681 B2
(45) Date of Patent: Jul. 3, 2012

(54) MOVING OBJECT DETECTION METHOD AND MOVING OBJECT DETECTION APPARATUS

(75) Inventors: Kunio Nobori, Osaka (JP); Masahiro Iwasaki, Kyoto (JP); Ayako Komoto, Osaka (JP)

(73) Assignee: Panasonic Corporation, Osaka (JP)

( * ) Notice: Subject to any disclaimer, the term of this patent is extended or adjusted under 35 U.S.C. 154(b) by 180 days.

(21) Appl. No.: 12/920,180

(22) PCT Filed: Dec. 18, 2009

(86) PCT No.: PCT/JP2009/006999
§ 371 (c)(1),
(2), (4) Date: Aug. 30, 2010

(87) PCT Pub. No.: WO2010/079556
PCT Pub. Date: Jul. 15, 2010

(65) Prior Publication Data
US 2011/0002509 A1    Jan. 6, 2011

(30) Foreign Application Priority Data

Jan. 9, 2009  (JP) .................................. 2009-004083
Sep. 10, 2009  (JP) .................................. 2009-209860

(51) Int. Cl.
*G06K 9/00* (2006.01)
*G06K 9/34* (2006.01)
(52) U.S. Cl. ....................................... 382/103; 382/173
(58) Field of Classification Search .................. 382/103, 382/173–180
See application file for complete search history.

(56) References Cited

U.S. PATENT DOCUMENTS

| 5,734,737 | A  | * | 3/1998  | Chang et al. ................. 382/107 |
| 6,643,387 | B1 | * | 11/2003 | Sethuraman et al. ........ 382/107 |
| 6,804,398 | B2 | * | 10/2004 | Kaneko et al. ............... 382/190 |

(Continued)

FOREIGN PATENT DOCUMENTS

JP    8-214289    8/1996

(Continued)

OTHER PUBLICATIONS

International Search Report issued Feb. 23, 2010 in International (PCT) Application No. PCT/JP2009/006999.

(Continued)

*Primary Examiner* — Alex Liew
(74) *Attorney, Agent, or Firm* — Wenderoth, Lind & Ponack, L.L.P.

(57) ABSTRACT

A moving object detection method with which a region of a moving object is accurately extracted without being affected by a change in shape or size or occlusion of the moving object and in which a distance indicating a similarity between trajectories of an image in each of the blocks included in video is calculated (S203) and a group of similar trajectories is identified as one region based on the distance (S209). Step S209 includes, for each of the thresholds, (1) non-linearization of the distance, (2) calculating a geodetic distance between plural trajectories from the distance after non-linearization (S204), (3) specifying, as region candidates, a group of trajectories which are distant from each other by the geodetic distance of a finite value, from among the trajectories (S205), calculating an interregional geodetic distance that is a scale indicating the similarity between the region candidates (S206), and selecting, from the region candidates, a region candidate having the interregional geodetic distance that satisfies a predetermined condition, as a result of segmentation (S207).

24 Claims, 18 Drawing Sheets

(a) Trajectories    (b) Result of clustering trajectories (C) First frame of result of region extraction (d) T frame of result of region extraction

U.S. PATENT DOCUMENTS

| | | | |
|---|---|---|---|
| 7,003,156 | B1 | 2/2006 | Yamamoto et al. |
| 2003/0123704 | A1* | 7/2003 | Farmer et al. ............ 382/103 |
| 2006/0045349 | A1* | 3/2006 | Yamamoto et al. ......... 382/190 |

FOREIGN PATENT DOCUMENTS

| | | |
|---|---|---|
| JP | 11-66319 | 3/1999 |
| JP | 2000-222584 | 8/2000 |
| JP | 2005-332206 | 12/2005 |
| JP | 2006-31114 | 2/2006 |
| JP | 2007-87049 | 4/2007 |
| JP | 4456181 | 4/2010 |
| WO | 2010/050110 | 5/2010 |

OTHER PUBLICATIONS

Japanese Patent Office Decision of a Patent Grant issued Jun. 1, 2010 in corresponding Japanese Patent Application No. 2010-513554.

P. Anandan, "*A Computational Framework and an Algorithm for the Measurement of Visual Motion*", International Journal of Computer Vision, vol. 2, pp. 283-310, 1989.

Vladimir Kolmogorov et al., "*Computing Visual Correspondence with Occlusions via Graph Cuts*", International Conference on Computer Vision, 2001.

Joshua B. Tenenbaum et al., "*A Global Geometric Framework for Nonlinear Dimensionality Reduction*", Science, vol. 290, pp. 2319-2322, Dec. 22, 2000.

E.W. Dijkstra, "*A note on two problems in connexion with graphs*", Numerische Mathematik, pp. 269-271, 1959.

Pedro F. Felzenszwalb and Daniel P. Huttenlocher, "*Efficient Graph-Based Image Segmentation*", International Journal of Computer Vision, vol. 59, No. 2, Sep. 2004.

* cited by examiner

Diagram of picture-taking situation

FIG. 5
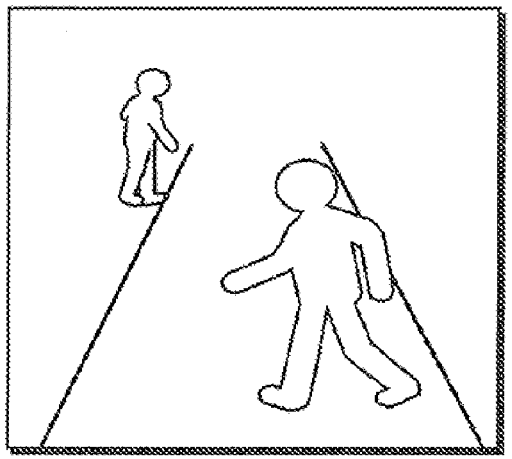
(a) Picture of first frame
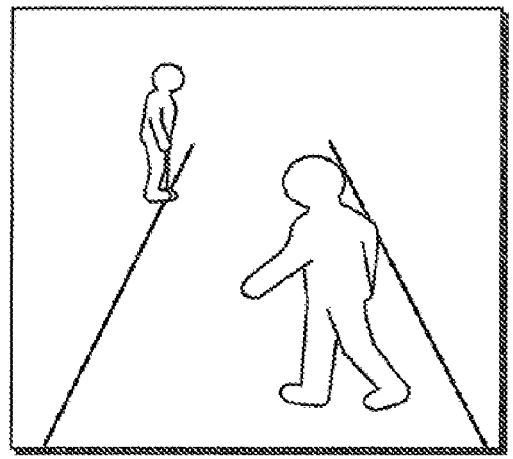
(b)
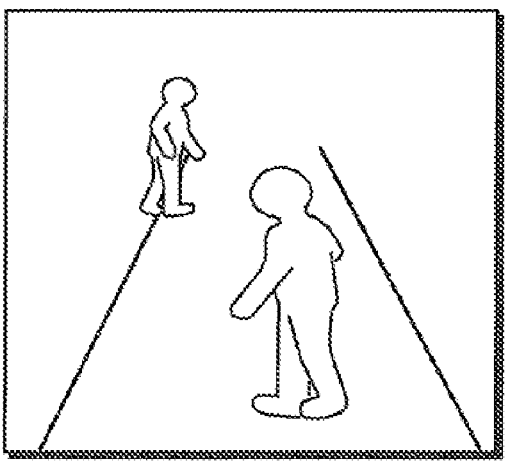
(c)
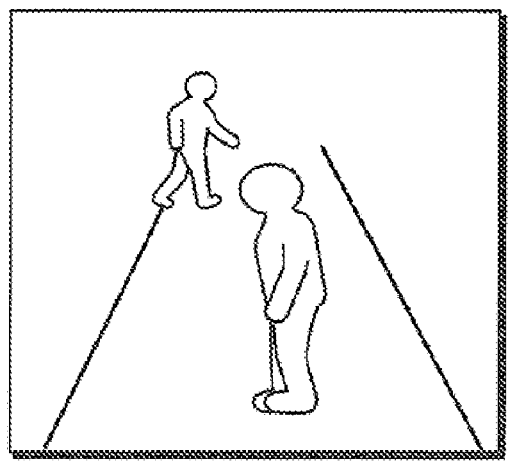
(d)
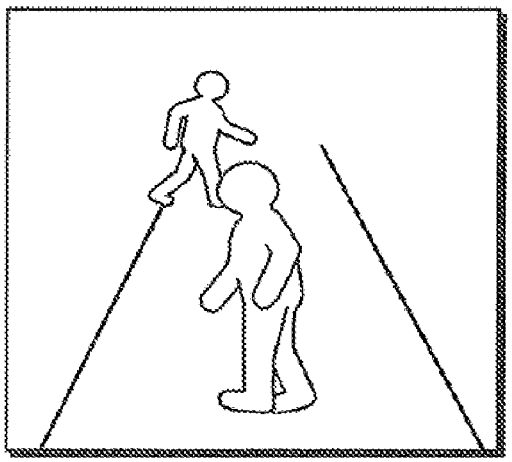
(e)
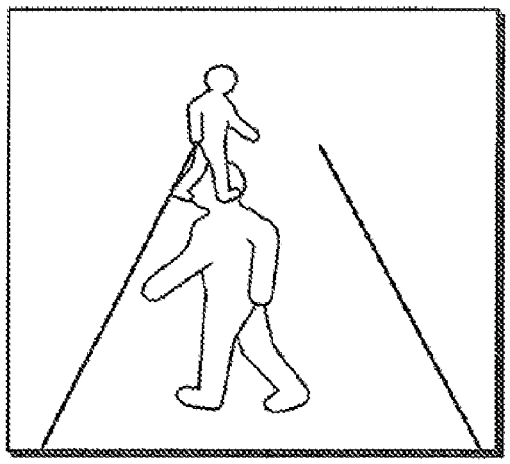
(f) Picture of T-th frame FIG. 9
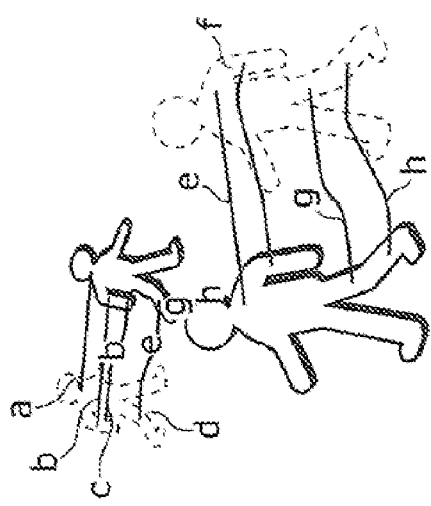
(a) Trajectories
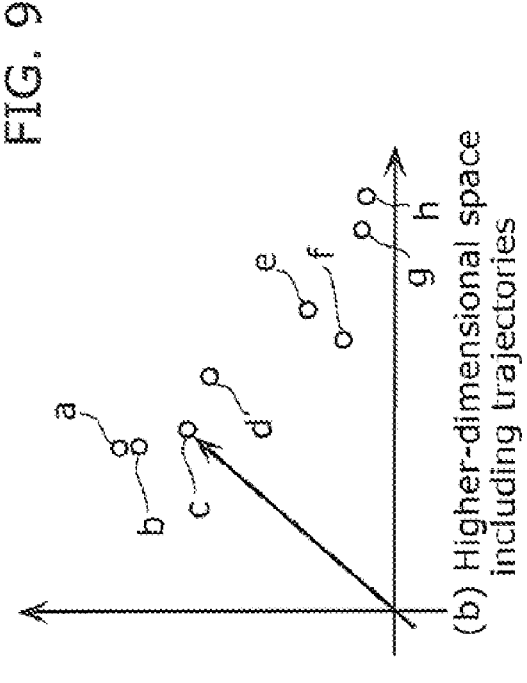
(b) Higher-dimensional space including trajectories
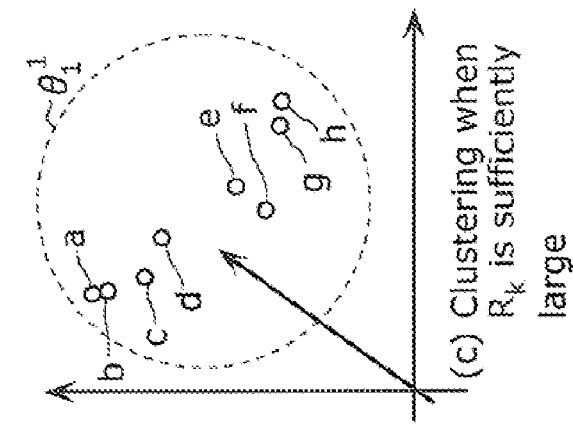
(c) Clustering when $R_k$ is sufficiently large
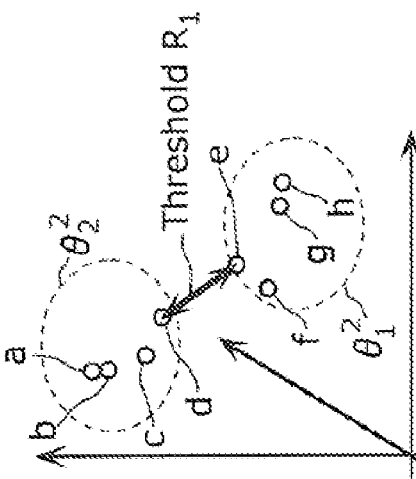
(d) Clustering at the time of $R_1$
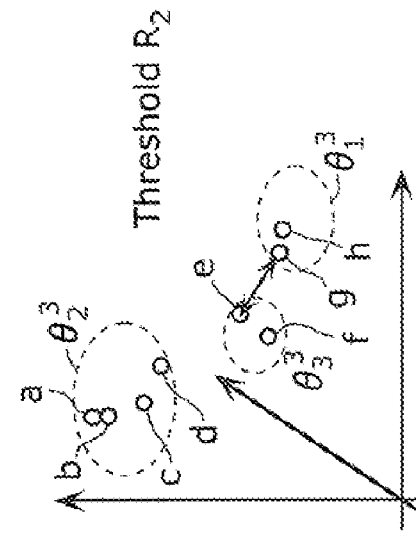
(e) Clustering at the time of $R_2$

FIG. 10

(a) Geodetic distance matrix $$G_k = \left\{ \begin{array}{c} a \cdots\cdots g_k(a,b) \\ g_k(i,j) \end{array} \right\}$$

(b) Representative geodetic distance matrix having one cluster $$G^1 = \left\{ \theta_1^1 \right\}$$

(c) Representative geodetic distance matrix having two clusters $$G^2 = \left\{ \begin{array}{cc} \theta_1^2 & \infty \\ \infty & \theta_2^2 \end{array} \right\}$$

(d) Representative geodetic distance matrix having three clusters $$G^3 = \left\{ \begin{array}{ccc} \theta_1^3 & & \infty \\ & \theta_3^3 & \\ \infty & & \theta_2^3 \end{array} \right\}$$

(e) Reference matrix having two clusters $$Gr^2 = \left\{ \phantom{XX} \right\}$$

(f) Reference matrix having three clusters $$Gr^3 = \left\{ \begin{array}{cc} & \infty \\ \infty & \end{array} \right\}$$

FIG. 11
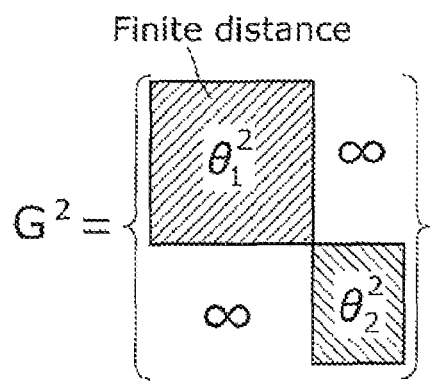
(a) Representative geodetic distance matrix having two clusters
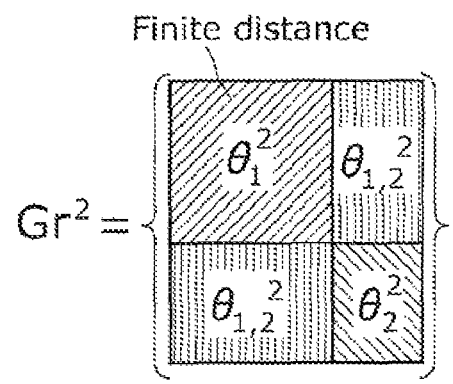
(b) Reference matrix having two clusters
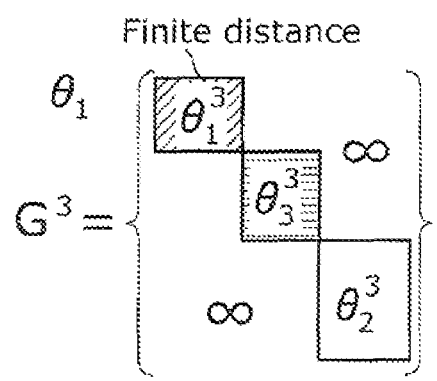
(c) Representative geodetic distance matrix having three clusters
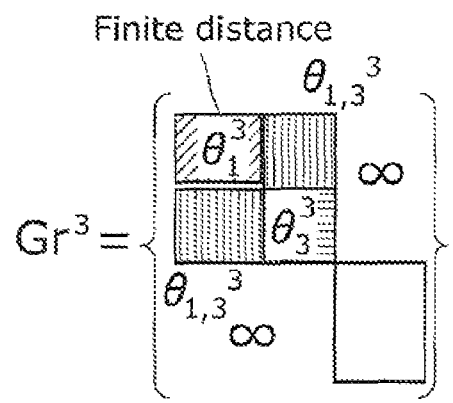
(d) Reference matrix having three clusters FIG. 15
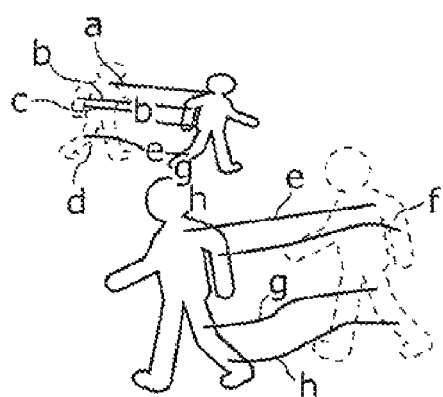
(a) Trajectories
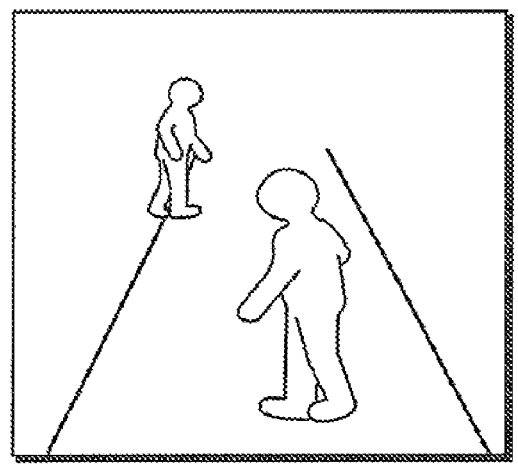
(b) Picture in T/2-th frame
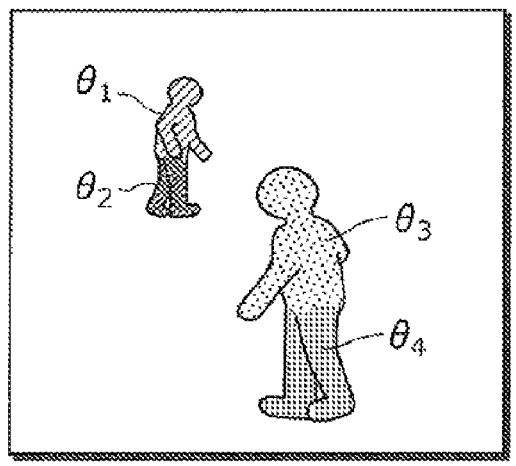
(c) Result of segmenting into plural sub regions based on color similarity
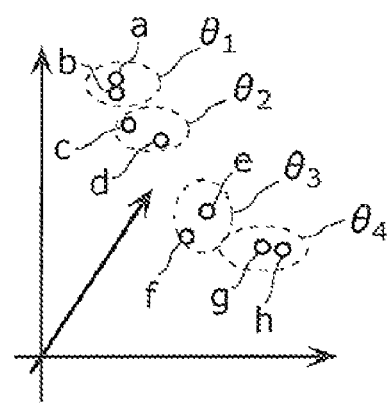
(d) Region candidates generated based on picture FIG. 16
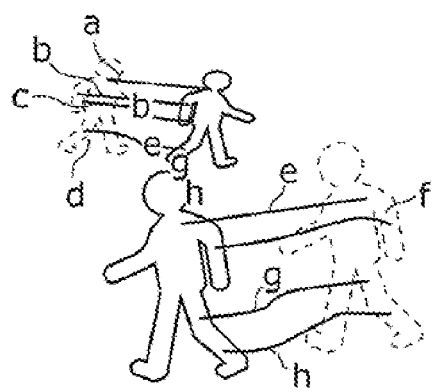
(a) Trajectories
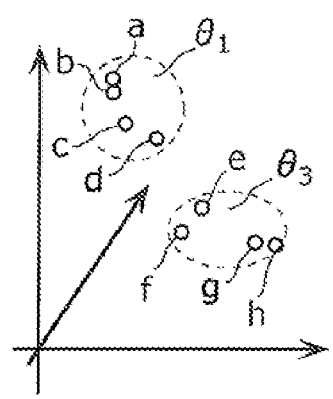
(b) Result of clustering trajectories
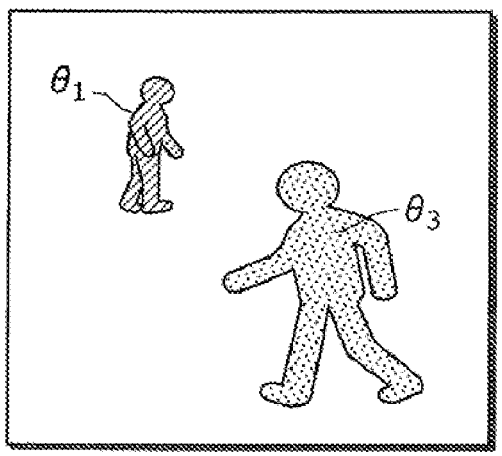
(C) First frame of result of region extraction
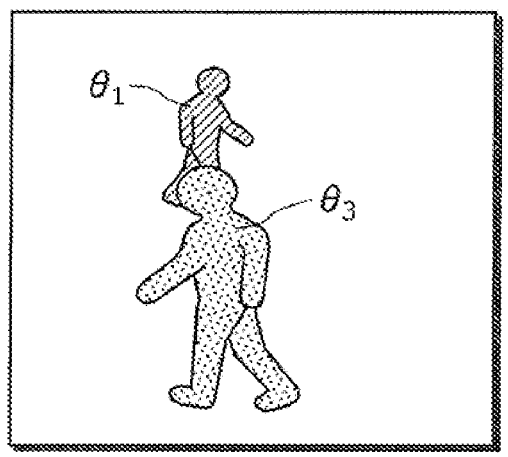
(d) T frame of result of region extraction FIG. 17
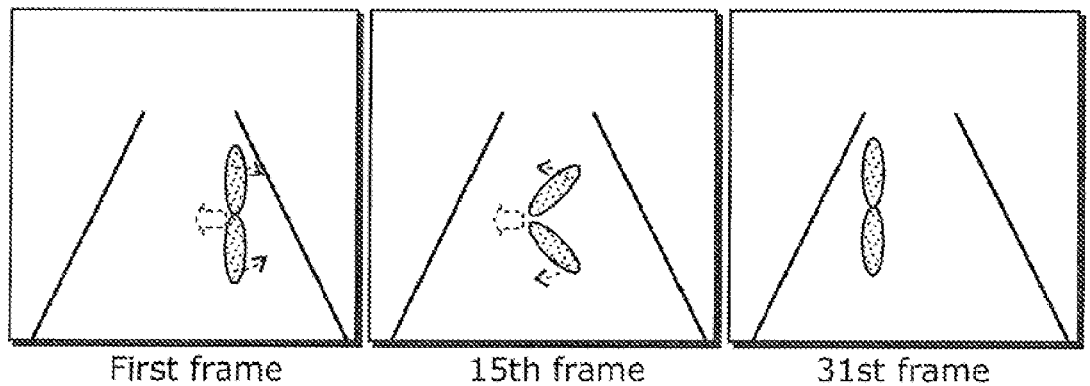
First frame    15th frame    31st frame
(a) Example of video of moving object having change in articulated form
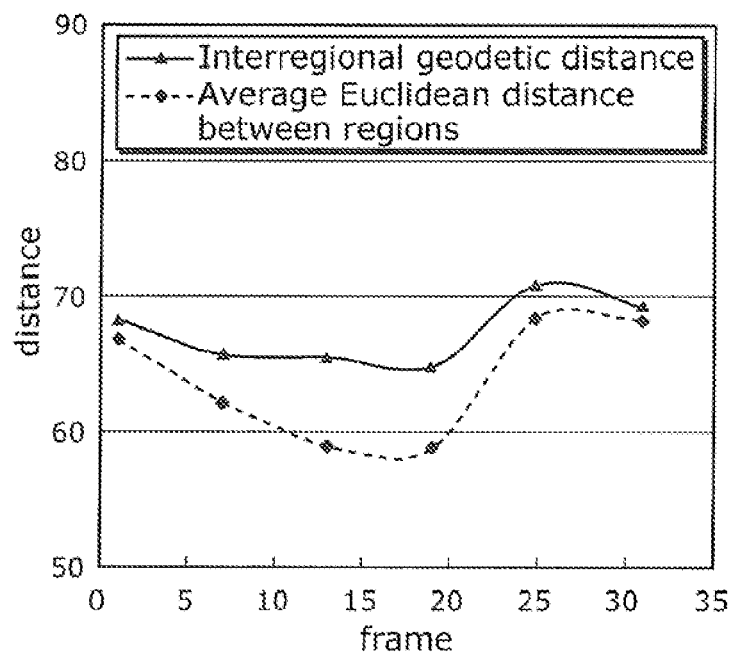
(b) Diagram of example of interregional geodetic distance and Euclidean distance between two region candidates having change in articulated form

MOVING OBJECT DETECTION METHOD AND MOVING OBJECT DETECTION APPARATUS

TECHNICAL FIELD

The present invention relates to an image processing technique of detecting a moving object by extracting a region of the moving object in an image, and in particular, relates to an apparatus that detects a region of a moving object based on motion information in a video even when the moving object such as a person moves changing its shape.

BACKGROUND ART

Research and development on a region extraction technique with which a moving object is detected by extracting a region of the moving object in an image from the image including an image of the moving object (hereinafter referred simply to as "moving object") has been widely carried out. The technique of extracting a region of a moving object is, particularly when the moving object is a person, a fundamental technique used in common for: image quality improvement processing for digital video cameras or digital still cameras; safe driving support system for vehicles; or a collision-avoidance control or a collision-avoidance alarm for a robot with people.

The technique of extracting a region of a moving object in an image includes the following two general methods: (1) a method of identifying a region of the moving object by evaluating the similarity between a moving object model prepared in advance and a candidate region in the image; and (2) a method of identifying a region of the moving object by segmenting the image into plural sub regions to calculate an amount of characteristics and integrating similar regions on the basis of the amount of characteristics.

The former method includes, as a representative method, a method of extracting a candidate of a moving object region from an image, and then evaluates the similarity between the candidate of the moving object region that has been extracted and a moving object model prepared in advance to extract a region with high similarity as the moving object region. There further is a method that utilizes a moving object model in consideration of change in shape when extracting a region of a moving object that moves changing its shape such as a walking person.

According to a method described in Patent Literature 1, for example, a silhouette image of a moving object is extracted from plural images, as a candidate of a moving object region. Further in the disclosed method, the similarity between a model related to a change in shape of the moving object that has been parameterized in advance and the silhouette image that has been extracted is evaluated, so that a parameter of a region with high similarity and the model is estimated. This makes it possible to apply the parameterized model also to the person that moves changing shape, thereby allowing extraction of a region of the moving object.

The latter method includes, as a representative method, a method of segmenting once an image into plural sub regions, extracting an amount of characteristics based on a brightness value of an pixel in each of the sub regions, and then evaluating the similarity of the amounts of characteristics between the plural sub regions, to integrate the regions with high similarities as the same moving object region.

According to the method described in Patent Literature 2, for example, an image is segmented once into rectangular sub regions, the amount of characteristics is calculated based on the brightness or motion of the sub regions, and the sub regions are integrated based on an order of the similarities of the amount of characteristics, thereby allowing extraction of the region of a moving object.

CITATION LIST

Patent Literature

[PTL 1] Japanese Unexamined Patent Application Publication No. 08-214289
[PTL 2] Japanese Unexamined Patent Application Publication No. 2006-031114

SUMMARY OF INVENTION

[Technical Problem]

In the conventional techniques of region extraction described above, however, there is a problem that a moving object cannot be accurately extracted in the case where the moving object is partially occluded by another moving object in such a scene in which plural moving objects such as people come and go in the street, for example, or in the case where a moving object that is significantly different in size is included.

With the conventional method of extracting a region using a model prepared in advance as represented by the method described in Patent Literature 1, it is necessary to extract a candidate of a moving object region from an image. In this case, the model obtained by parameterizing the moving object cannot be accurately applied to the candidate of the moving object region unless the candidate of the moving object region is appropriately extracted. In the scene described above, in particular, since the shape or size of the moving object changes significantly, it is difficult to appropriately extract the candidate of a moving object region.

Furthermore, even when the candidate of the moving object region is appropriately extracted, there still remains a problem as described below. Particularly in the case where the moving object is an articulated object such as a person, since the range of changes in shape or size in an image due to a variety of postures or a size of the moving object is significantly large, a huge number of parameters are required when performing parameterization on the moving object model. This induces an error in applying a model. Thus, there is a problem in that the moving object cannot be detected accurately because, for example, plural moving objects are erroneously regarded as one moving object in extracting a region, or a region in which a moving object to be extracted does not exist is erroneously extracted as a moving object.

With the conventional method of extracting a region using the amount of characteristics between sub regions as represented by the method described in Patent Literature 2, two sub regions having the brightness values or motions which are used as the amount of characteristics and which are not similar to each other are separated and extracted as regions belonging to two moving objects different from each other. Thus, there is a problem in that the moving object cannot be detected accurately because, when the brightness value of a moving object differs depending on a position and the motion differs depending on the position, as in a person, two sub regions, even in the same moving object, are erroneously separated and extracted as regions belonging to two moving objects different from each other.

Therefore, the present invention has been conceived in view of solving the aforementioned conventional problems, and it is an object thereof to provide a moving object detection method and so on capable of accurately extracting a region of a moving object without being affected by a change in shape or size or occlusion of the moving object in a video.

[Solution to Problem]

In order to achieve the object described above, an aspect of a moving object detection method according to the present invention is a moving object detection method for detecting a moving object in video by performing segmentation on all or part of the moving object in the video, the moving object detection method including: obtaining trajectories each of which is a corresponding point between images included in the video, and calculating distances each of which indicates similarity between the trajectories, for the obtained trajectories; and performing segmentation by identifying a group of similar trajectories as one region, based on the distances calculated in the calculating of distances, wherein the performing segmentation includes: calculating geodetic distances between the trajectories using the distances between the trajectories calculated in the calculating of distances; generating region candidates using the trajectories, each of the region candidates being a group of the trajectories; calculating interregional geodetic distances, for the region candidates generated in the generating region candidates, based on the geodetic distances between the trajectories belonging to the region candidates, each of the interregional geodetic distances indicating similarity between the region candidates; and selecting, as a result of the segmentation, a region candidate having one of the interregional geodetic distances which is calculated in the calculating of interregional geodetic distances and which satisfies a predetermined condition, from among the region candidates generated in the generating region candidates.

The aforementioned configuration allows selecting a candidate for region extraction without being affected by a local distance in a region candidate, by selecting a region candidate based on an interregional geodetic distance between region candidates, thereby making it possible to extract a region more accurately. More specifically, since image regions having similar trajectories are integrated to be a region candidate, the similarity between the region candidates is determined when selecting the region candidate, and the similarity between the region candidates is determined using an interregional geodetic distance that is defined based on the geodetic distance between trajectories, the image region having a similar motion is accurately extracted, and thus the moving object is accurately extracted even when the moving object is partially occluded by another moving object or a moving object having a significantly different size is included, while avoiding that, two sub regions in the same moving object are erroneously separated and extracted as regions belonging to two moving objects different from each other even when the brightness value of the moving object differs depending on a position and the motion differs depending on the position, as in a person.

It is to be noted that the moving object detection method according to the present invention can be realized not only as a program on a computer but also as a moving object detection apparatus in which each of the steps described above is configured as hardware, a program causing a computer to execute each of the steps described above, a computer readable recoding medium on which the program is stored, such as a CD-ROM, an image processing apparatus that extracts or segments a region of an object having motion in a video, and the like.

[Advantageous Effects of Invention]

With the aforementioned method, apparatus, and so on, it is possible to perform segmentation based on a geodetic distance between trajectories of two region candidates, making it possible to accurately extract a region of a moving object without being affected by a change in shape or size or occlusion of the moving object in a video. Furthermore, it is also possible to predict movement of the moving object using a result of the region extraction.

The present invention therefore has a significantly high practical value today when moving image capturing apparatuses such as digital video cameras have come into wide use, as an applied technology to a focus control or image quality improvement processing for digital cameras, a safe driving support system for vehicles; or a collision-avoidance control or a collision-avoidance alarm for a robot with people.

BRIEF DESCRIPTION OF DRAWINGS

FIG. 5(*a*) to (*f*) is a diagram which shows an example of plural pictures included in an input video according to an embodiment of the present invention.

FIG. 9(*a*) to (*e*) is a diagram which shows an example of a clustering using the geodetic distance.

FIG. 10 (*a*) to (*f*) is a diagram which shows an example of a geodetic distance matrix, a representative geodetic distance matrix, and a reference matrix.

FIG. 11 (*a*) to (*d*) is a diagram which shows an example of a representative geodetic distance matrix and a reference matrix.

FIG. 15 (*a*) to (*d*) is a diagram which shows an example of a region candidate according to Embodiment 2 of the present invention.

FIG. 16 (*a*) to (*d*) is a diagram which shows an example of trajectories, in which (b) shows an example of a clustering of the trajectories and (c) and (d) show a result of region extraction.

FIGS. 17(*a*) and (*b*) is a diagram which explains an effect of performing segmentation using an interregional geodetic distance.

DESCRIPTION OF EMBODIMENTS

Figure 1:
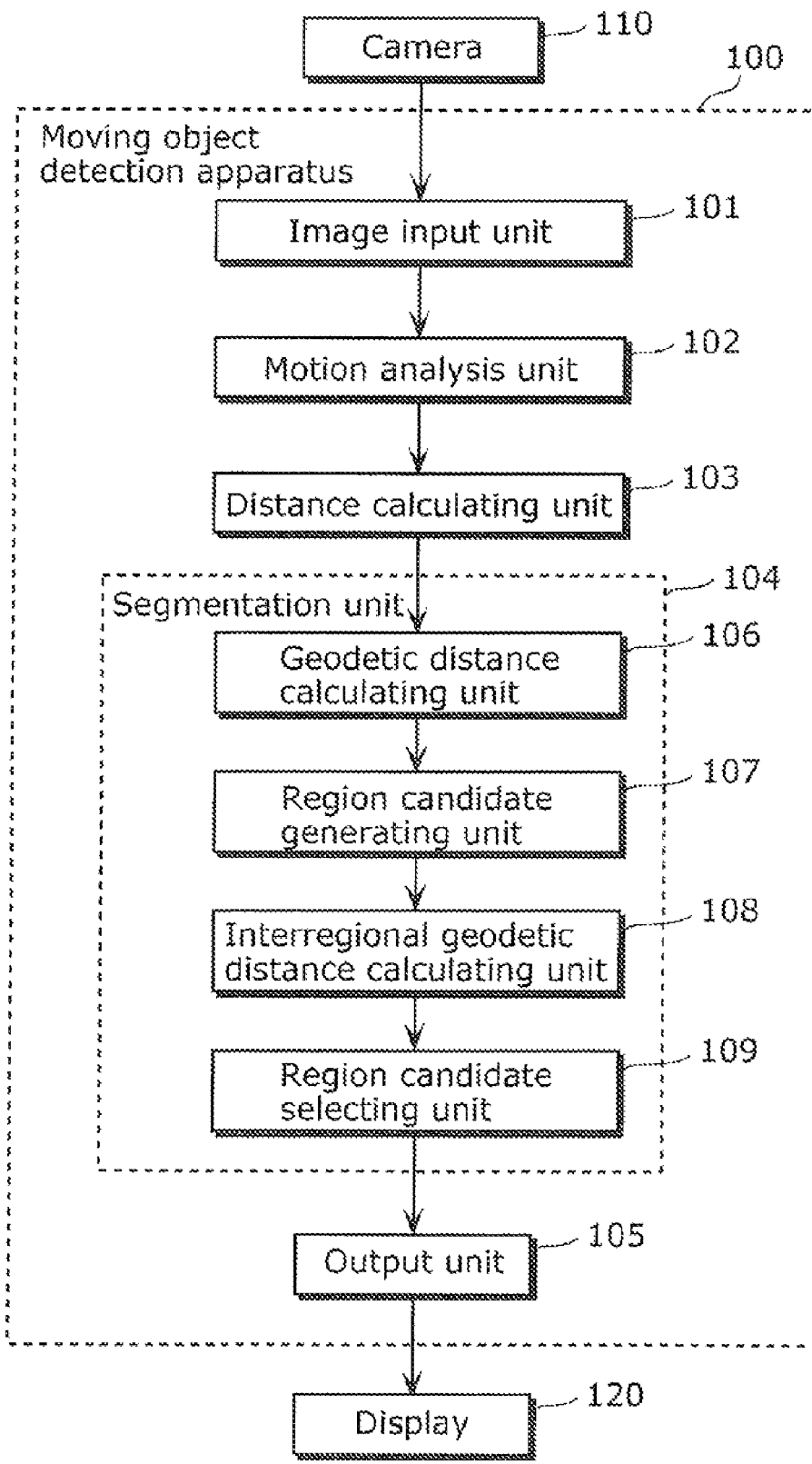
FIG. 1 is a diagram which shows a configuration of a moving object detection apparatus according to Embodiment 1 of the present invention.

An embodiment of the present invention is a moving object detection method for detecting a moving object in video by performing segmentation on all or part of the moving object in the video, the moving object detection method including: obtaining trajectories each of which is a corresponding point between images included in the video, and calculating distances each of which indicates similarity between the trajectories, for the obtained trajectories; and performing segmentation by identifying a group of similar trajectories as one region, based on the distances calculated in the calculating of distances, wherein the performing segmentation includes: calculating geodetic distances between the trajectories using the distances between the trajectories calculated in the calculating of distances; generating region candidates using the trajectories, each of the region candidates being a group of the trajectories; calculating interregional geodetic distances, for the region candidates generated in the generating region candidates, based on the geodetic distances between the trajectories belonging to the region candidates, each of the interregional geodetic distances indicating similarity between the region candidates; and selecting, as a result of the segmentation, a region candidate having one of the interregional geodetic distances which is calculated in the calculating of interregional geodetic distances and which satisfies a predetermined condition, from among the region candidates generated in the generating region candidates.

Here, capturing pictures included in the video, calculating the trajectories by detecting motions of an image between two temporally adjoining pictures in units of a block, and concatenating the detected motions for the pictures may further be included, the block including one or more pixels and constituting each of the pictures, and wherein in the calculating of distances, the trajectories calculated in the calculating of the trajectories are obtained and the distances are calculated. The aforementioned configuration allows selecting a candidate for region extraction without being affected by a local distance in a region candidate, by selecting a region candidate based on an interregional geodetic distance between region candidates, thereby making it possible to extract a region more accurately.

It is to be noted that, the calculating of distances may include calculating, as a distance indicating the similarity between the trajectories, an average value of Euclidean distance between the trajectories of the images. Further, as a specific method of calculating of geodetic distances, the calculating of geodetic distances may include, when calculating a geodetic distance from a first trajectory to a second trajectory, calculating, as one of the geodetic distances, a shortest path among all of paths that pass through, as a relay point, the trajectories obtained in the calculating of distances to reach the second trajectory from the first trajectory. More specifically, it is preferable that the calculating of geodetic distances includes (1) calculating a distance nonlinearized by transforming, into an infinite value, a part of the distances between the trajectories calculated in the calculating of distances, and (2) calculating, in calculating of the geodetic distance from the first trajectory to the second trajectory based on the nonlinear distance, as one of the geodetic distances, the shortest path among all of the paths that pass through, as a relay point, another at least one of the trajectories to reach the second trajectory from the first trajectory.

Here, as a method of generating region candidates, the calculating of geodetic distances may include: obtaining thresholds; and calculating a distance in a path which passes through trajectories in a neighborhood, for each of the thresholds, using the distances between the trajectories calculated in the calculating of distances, and using the obtained thresholds as the thresholds defining the neighborhood of the trajectories, so that the geodetic distances between the trajectories are calculated, and the generating region candidates may generate the region candidates by identifying a group of similar trajectories as one region candidate, based on the geodetic distance between the trajectories for each of the thresholds calculated in the calculating of geodetic distances. At this time, as a specific example of the thresholds, it is preferable that the calculating of geodetic distances includes generating, as the thresholds, values between a maximum value and a minimum value among the distances calculated in the calculating of distances. With this, by limiting the candidate for the threshold, it is possible to perform region extraction at higher speed.

Further, as a method of calculating of interregional geodetic distances, the calculating of interregional geodetic distances includes calculating, for each of the thresholds, interregional geodetic distances between two region candidates in a first set of region candidates among the region candidates generated in the generating region candidates, using a representative geodetic distance and a reference geodetic distance, the representative geodetic distance being a geodetic distance in the two region candidates and the reference geodetic distance being a geodetic distance in a second set of region candidates including region candidates by a total number next smaller to a total number of the region candidates included in the first set of region candidates. More specifically, in the calculating of interregional geodetic distances, the interregional geodetic distances are calculated by calculating an index value indicating a distance between the two region candidates and an index value indicating variation in each of the region candidates, based on the reference geodetic distance and the representative geodetic distance, and normalizing the index value indicating the distance, using the index value indicating the variation. Or, it is further preferable that the interregional geodetic distances calculated in the calculating of interregional geodetic distances is a value obtained by normalizing an index value which indicates a distance between two region candidates and is calculated from a summation of geodetic distances between trajectories belonging to one region candidate and trajectories belonging to another region candidate, using an index value indicating variation in the region candidates calculated from a summation of geodetic distances between trajectories belonging to the one region candidate and an index value indicating variation in the region candidates calculated from a summation of geodetic distances between trajectories belonging to the other region candidate. With the configuration described above, it is possible to calculate the interregional geodetic distance to which a distance between region candidates is accurately reflected, and thus it is possible to perform region extraction of a moving object more accurately.

Here, as a criteria for selecting a region candidate, the selecting a region candidate may include selecting, from among the region candidates generated in the generating of region candidates, all of two region candidates having the interregional geodetic distance which is calculated in the calculating of interregional geodetic distances and which is greater than a predetermined threshold, and outputting the selected region candidates, as a result of the segmentation. With this, since region candidates with a large interregional geodetic distance are selected, the image region having significantly different motion is separated and the moving object or a region of the moving object is accurately extracted.

Further, as another criteria for selecting a region candidate, it is preferable that the selecting a region candidate includes selecting, from among the region candidates generated in the generating of region candidates, a region candidate based on a temporal change in the interregional geodetic distances calculated in the calculating of interregional geodetic distances, and outputting the selected region candidate as a result of the segmentation. To be more specific, it is preferable that the selecting a region candidate includes: selecting, from among the region candidates generated in the generating region candidates, two region candidates having interregional geodetic distances whose temporal change is greater than a predetermined threshold, as different regions, and outputting the selected region candidates as a result of the segmentation; selecting, from among the region candidates generated in the generating of region candidates, two region candidates having interregional geodetic distances whose temporal change is smaller than a predetermined threshold, as a same region, and outputting the selected region candidates as a result of is the segmentation; and selecting, from among the region candidates generated in the generating of region candidates, a region candidate based on a temporal change in the interregional geodetic distances calculated in the calculating of interregional geodetic distances so that (1) two region candidates are more different as the temporal change in the interregional geodetic distances of the two candidates is greater and (2) two region candidates are more similar as the temporal change in the interregional geodetic distances of the two candidates is smaller, and outputting the selected region candidate as a result of the segmentation, the calculating of distances and performing segmentation are repeatedly performed for a new video, and the selecting a region candidate includes selecting, from among the region candidates generated in the generating of region candidates, all of two region candidates having the interregional geodetic distances which have been calculated in the calculating of interregional geodetic distances and which have temporal changes greater than a predetermined threshold, in the calculating of distances and performing segmentation performed repeatedly, as a result of the segmentation, and outputting the selected region candidates.

With the configuration described above, it is possible to select a region candidate that has a motion different from a certain region candidate, by selecting a region candidate based on a temporal change of an interregional geodetic distance, and thus it is possible to perform region extraction of a moving object more accurately.

Further, as another method of generating of region candidates, the generating of region candidates may include generating region candidates by generating images of the region candidates using brightness information of the images obtained in the capturing pictures and identifying at least one group of trajectories corresponding to the images of the region candidates. With this, since a region candidate is generated based on brightness information of an image, an image region having similar brightness is determined as one region in segmentation, and thus accuracy in segmentation is improved.

Further, as the number of trajectories including region candidates, the region candidates generated in the generating of region candidates may include at least one of the region candidates to which a single trajectory belongs, and the calculating of interregional geodetic distances may include outputting, as an interregional geodetic distance between the at least one of the region candidates to which the single trajectory belongs and another region candidate, a geodetic distance of the single trajectory and a given one trajectory belonging to the other region candidate.

At this time, as a method of generating of region candidates, the selecting a region candidate may include identifying, as a same region, two trajectories having the geodetic distance between trajectories whose temporal change is smaller than a predetermined threshold, the geodetic distance having been output as the interregional geodetic distance, and the selecting a region candidate may include identifying, as different regions, two trajectories having the geodetic distance between trajectories whose temporal change is greater than a predetermined threshold, the geodetic distance having been output as the interregional geodetic distance. With this, the interregional geodetic distance is appropriately calculated and the region candidate is appropriately generated depending on a temporal change of a geodetic distance even when only one trajectories is included in one region candidate, and thus it is possible to accurately perform region extraction of a moving object.

Further, performing image processing on, and outputting, the video captured in the capturing pictures, so as to be displayed in a different mode for each of the regions identified in the performing segmentation, may further be included. With this, image processing is performed in a different display mode for each of the specified regions, and thus it is possible to easily identify the detected moving object.

Further, estimating a motion of the moving object by calculating, using trajectories included in the region identified in the performing segmentation, a representative trajectory that represents the region, and estimating that the region moves according to the representative trajectory that has been calculated, may further be included. With this, it is possible to predict a motion more accurately.

The following is a description of embodiments according to the present invention, with reference to the drawings.

(Embodiment 1)

FIG. 1 is a diagram which shows a configuration of a moving object detection apparatus 100 according to Embodiment 1. As shown in FIG. 1, the moving object detection apparatus 100 includes: an image input unit 101; a motion analysis unit 102; a distance calculating unit 103; a segmentation unit 104; and an output unit 105. Here, the segmentation unit 104 includes: a geodetic distance calculating unit 106; a region candidate generating unit 107; an interregional geodetic distance calculating unit 108; and region candidate selecting unit 109. The moving object detection apparatus 100 is an apparatus that detects a moving object in a video by segmenting all or part of region of the moving object in the video including plural pictures. According to the present embodiment, the moving object detection apparatus 100 obtains a video captured by a camera 110, detects a moving object in the obtained video, and generates and outputs an image based on a result of the detection. The display 120 displays the image provided from the moving object detection apparatus 100.

The image input unit 101 is a processing unit that captures temporally different pictures included in the video transmitted from the camera 110 or the like, and is, for example, a video camera, a communication interface connected to a video camera, or the like.

The motion analysis unit 102 is a processing unit that detects a motion of an image between two temporally adjoining pictures for each block including one or more pixels making up the pictures captured by the image input unit 101 and concatenates the detected motion for plural pictures, thereby calculating a trajectory. That means that a block is a unit for calculating a trajectory and a group of one or more pixels.

The distance calculating unit 103 is a processing unit that obtains plural trajectories each of which is a corresponding point between images included in the video and calculates a distance indicating a similarity between the trajectories that have been obtained. In the present embodiment, in order to detect a change in shape of the moving object, a distance indicating a similarity between motions of blocks, using the trajectory of a block i calculated by the motion analysis unit 102 and the trajectory of a block other than the block i. Accordingly, in the case where trajectories of I blocks are used, the distance to be calculated is a distance matrix including I rows and I columns (I×I). Here, it is possible to represent, as the distance matrix, a motion of a moving object of which the distance between blocks changes according to the motion, particularly an object that moves changing its shape such as an articulated object including a person, by calculating a distance for evaluating the similarity of the motion of blocks. It is to be noted that the trajectory of the block i is referred to as a trajectory i in the description below. As described above, a distance according to the present Description includes not only the distance between two points in a two-dimensional space but also an arithmetic distance between multidimensional data, and is one value or a group of values (distance matrix) as described below. It is to be noted that the distance calculating unit 103 calculates, as a distance indicating the similarity between trajectories, an average of Euclidean distance between trajectories of plural images, for example.

The segmentation unit 104 is a processing unit that performs segmentation by identifying a group of similar trajectories as one region, based on the distance calculated by the distance calculating unit 103. The segmentation unit 104 includes: a geodetic distance calculating unit 106; a region candidate generating unit 107; an interregional geodetic distance calculating unit 108; and region candidate selecting unit 109.

The geodetic distance calculating unit 106 and the region candidate generating unit 107 included in the segmentation unit 104 detect discontinuity in a distribution of distance between trajectories, using the distance matrix calculated by the distance calculating unit 103 and generate plural region candidates each having trajectories distant from each other by a distance smaller than the detected discontinuous point form one cluster.

More specifically, the geodetic distance calculating unit 106 generates plural thresholds that are criteria used for segmentation, and for each of the generated thresholds, (1) performs non-linearization on the distance calculated by the distance calculating unit 103 to transform a distance larger than the threshold into an infinite value, and (2) calculates a geodetic distance between the plural trajectories calculated by the motion analysis unit 102, using the non-linearized distance.

The region candidate generating unit 107 generates plural region candidates by specifying, as region candidates, a group of trajectories which are distant from each other by the geodetic distance of a finite value, based on the geodetic distance between respective trajectories of plural thresholds generated by the geodetic distance calculating unit 106

The interregional geodetic distance calculating unit 108 performs, on the region candidates calculated by the region candidate generating unit 107, calculation of interregional geodetic distance that indicates the similarity between two region candidates, based on the geodetic distance between plural trajectories belonging to the region candidates.

The region candidate selecting unit 109 selects a region candidate using the interregional geodetic distance calculated by the interregional geodetic distance calculating unit 108 and performs clustering for the trajectories corresponding to the selected region candidate, thereby detecting a moving object in the image and segmenting the image. More specifically, the region candidate selecting unit 109 selects, as a result of the segmentation, the region candidate having the interregional geodetic distance which is calculated by the interregional geodetic distance calculating unit 108 and which satisfies a condition specified in advance, from among region candidates generated by the region candidate generating unit 107.

The output unit 105 outputs the result of detecting the moving object in the video or the result of segmentation of the image performed by the segmentation unit 104. More specifically, the output unit 105 performs image processing on, and outputs to the display 120 or the like, the video captured by the image input unit 101 so as to be displayed, for example, in a different mode per region identified by the segmentation unit 104.

In the present Description, "region extraction" includes both of the detection technique that extracts an image region including a specific object and the segmentation technique that segments the image region for each object regardless of the object. It is to be noted that, since the detection technique and the segmentation technique have a lot in common, they are not discriminated in the present Description.

Figure 2:
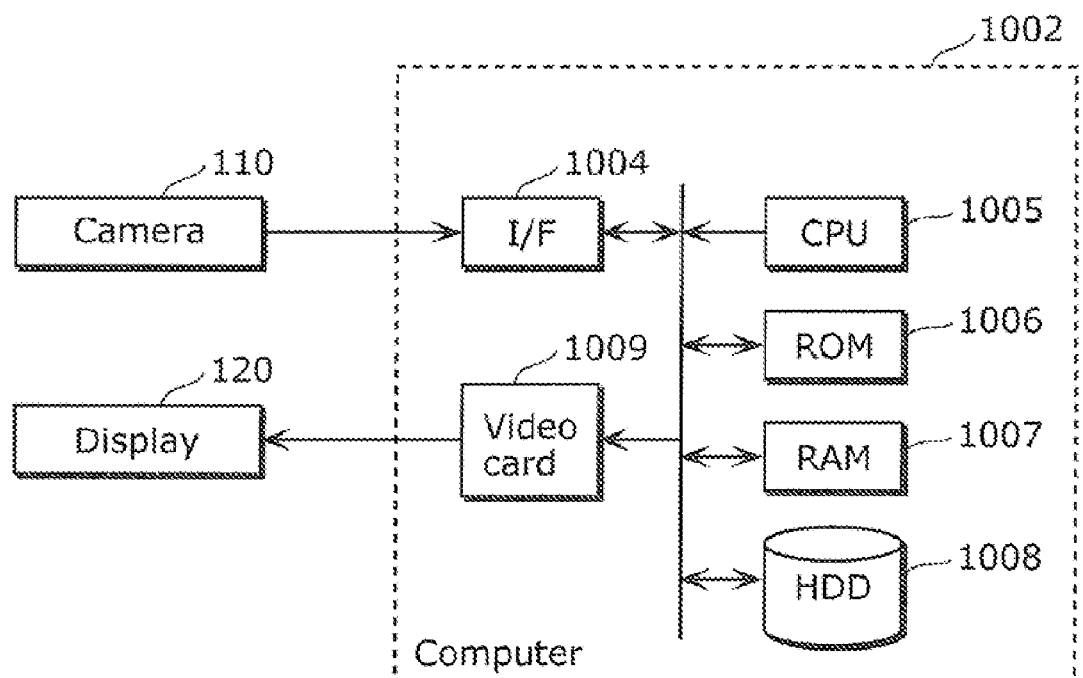
FIG. 2 is a diagram which shows a hardware configuration of the moving object detection apparatus configured by a computer.

It is to be noted that each of the components included in the above-described moving object detection apparatus 100 (the image input unit 101, the motion analysis unit 102, the distance calculating unit 103, the segmentation unit 104, and the output unit 105) may be implemented as software such as a program executed on a computer, or may be implemented as hardware such as an electronic circuit. FIG. 2 is a diagram which shows a hardware configuration of the moving object detection apparatus implemented as software according to the present embodiment. In FIG. 2, the camera 110 captures and outputs an image, and a computer 1002 obtains and performs region extraction processing on the image to generate an image that displays a result of the region extraction. The display 120 obtains and displays the image generated by the computer 1002. The computer 1002 includes: an I/F 1004; a CPU 1005; a ROM 1006; a RAM 1007; an HDD 1008, and a video card 1009. The program that causes the computer 1002 to operate is held by the ROM 1006 or the HDD 1008 in advance. The program is read by the CPU 1005 that is a processor, from the ROM 1006 or the HDD 1008 to the RAM 1007, to be developed. The CPU 1005 executes each instruction that is coded in the program developed by the RAM 1007. The I/F 1004, in response to the execution of the program, downloads the image captured by the camera 110, onto the RAM 1007. The video card 1009 outputs the image generated in response to the execution of the program, to be displayed on the display 120.

It is to be noted that the computer program is not limited to being stored in the ROM 1006 that is a semiconductor, or the HDD 1008, but may be stored in an optical disk, for example. In addition, the computer program may be transmitted via a wired or wireless network, broadcasting, and so on, and downloaded onto the RAM 1007 of the computer.

Figure 3:
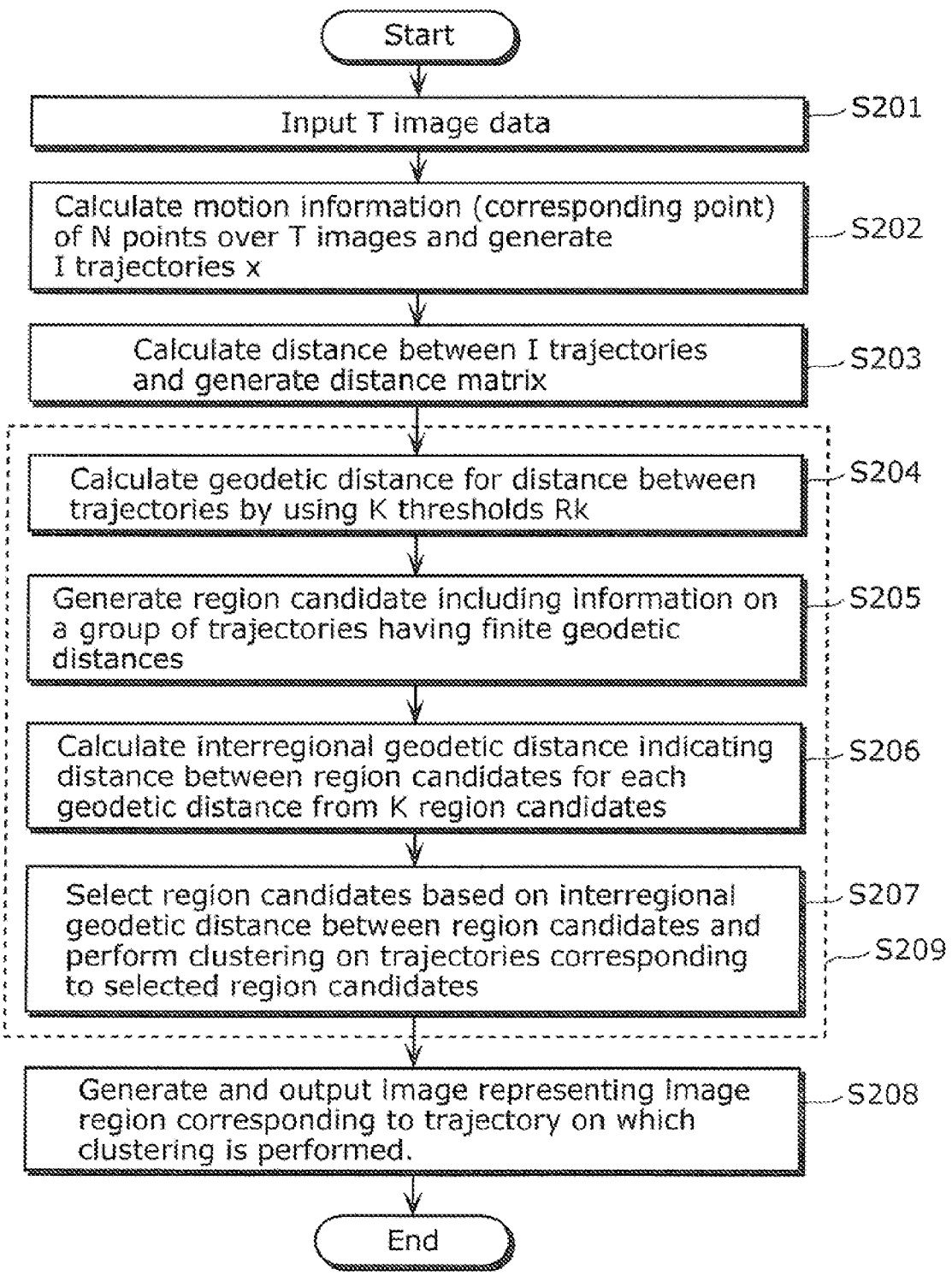
FIG. 3 is a flowchart which shows operation processes of the moving object detection apparatus according to Embodiment 1 of the present invention.

The following describes an operation of the moving object detection apparatus 100 according to the present embodiment, with reference to FIG. 3.

FIG. 3 is a flowchart that shows an operation of the moving object detection apparatus 100 according to the present embodiment.

In FIG. 3, seven Steps S201 to S209 respectively correspond to the processing units in FIG. 1. More specifically, the image input unit 101 performs an image inputting step S201, the motion analysis unit 102 performs a motion analyzing step S202, the distance calculating unit 103 performs a distance calculating step 203, the geodetic distance calculating unit 106 performs a geodetic distance calculating step S204, the region candidate generating unit 107 performs a region candidate generating step S205, the interregional geodetic distance calculating unit 108 performs an interregional geodetic distance calculating step S206, the region candidate selecting unit 109 performs a region candidate selecting step S207, and the output unit 105 performs an image outputting step S208. The segmentation unit 104 performs segmentation step S209.

In the image inputting step S201, the image input unit 101 obtains plural pictures included in a video from the camera 110. It is assumed here that T pictures are input.

Figure 4:
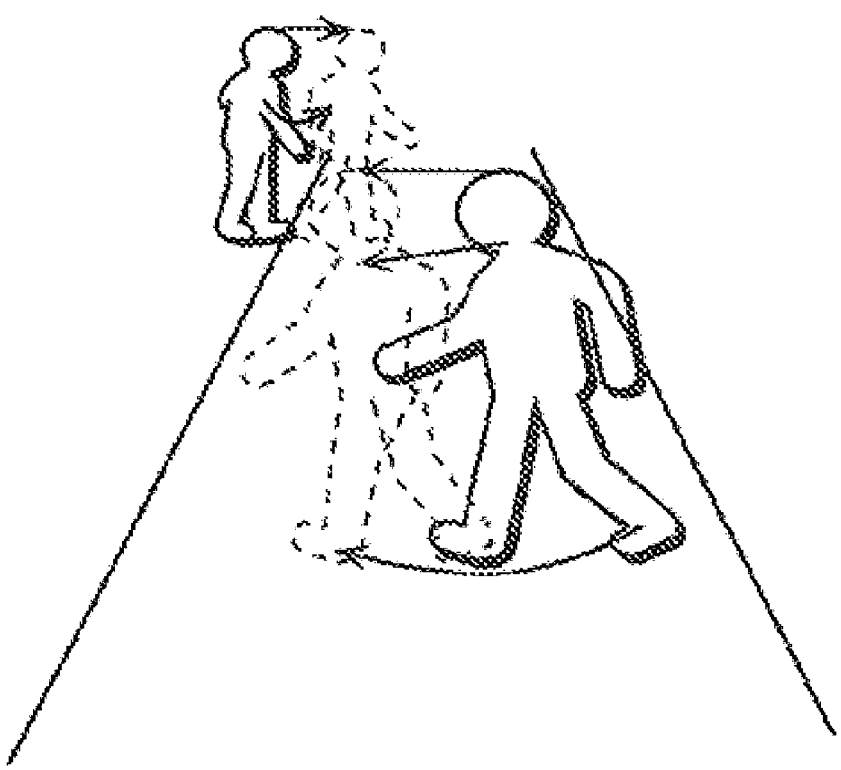
FIG. 4 is a diagram which shows an example of a picture-taking situation according to an embodiment of the present invention.

FIG. 4 is a diagram which shows an example of a picture-taking situation that is a situation of an object to be captured by the camera 110. Furthermore, FIGS. 5(a) to 5(f) is a diagram which shows an example of pictures included in the video captured by the camera 110 in the picture-taking situation of FIG. 4. The image input unit 101 captures T pictures starting from the first frame to the Tth frame, from the camera 110. According to the present embodiment, the number of pictures T is assumed to be specified in advance.

Next in the motion analyzing step S202, the motion analysis unit 102 calculates motion information between the pictures that have been input, and generates and outputs trajectories. As a method for calculating a motion between plural pictures, on the basis of I pixels in one picture out of the plural pictures here, the other (T−1) pictures to are searched for a corresponding pixel. It is to be noted that I small rectangular regions (blocks) may be specified as the basis, instead of the I pixels. For example, by using the pictures of t frame and (t+1) frame, a pixel coordinate (xit+1, yit+1) on the picture of the (t+1) frame, which corresponds to a pixel coordinate (xit, yit) (i=1 . . . I) of a pixel i on the picture of the t frame, is estimated. In the case where equal to or more than three pictures are included, I corresponding points of all of T pictures that have been input are calculated by sequentially calculating corresponding coordinates.

A detailed explanation for the specific method of calculating the corresponding point between the pictures described above is omitted here as described in detail in Non Patent Literature 1, Non Patent Literature 2, or the like.

(Non Patent Literature 1) P. Anandan, "A Computational Framework and an Algorithm for the Measurement of Visual Motion", International Journal of Computer Vision, Vol. 2, pp. 283-310, 1989

(Non Patent Literature 2) Vladimir Kolmogorov and Ramin Zabih, "Computing Visual Correspondence with Occlusions via Graph Cuts", International Conference on Computer Vision, 2001

Then in the motion analyzing step S202, the motion analysis unit 102 generates, from a group of pixel coordinates of the corresponding point, I trajectories which indicate motion information of I pixels over T pictures and each of which is associated with a corresponding one of the I pixels, as in Expression 1 below.

[Math. 1]

$$x^i = (x_1^i, y_1^i, \ldots, x_t^i, y_t^i, \ldots, x_T^i, y_T^i) \quad \text{(Expression 1)}$$

Here, T is the number of pictures used for calculating the trajectory.

Figure 6:
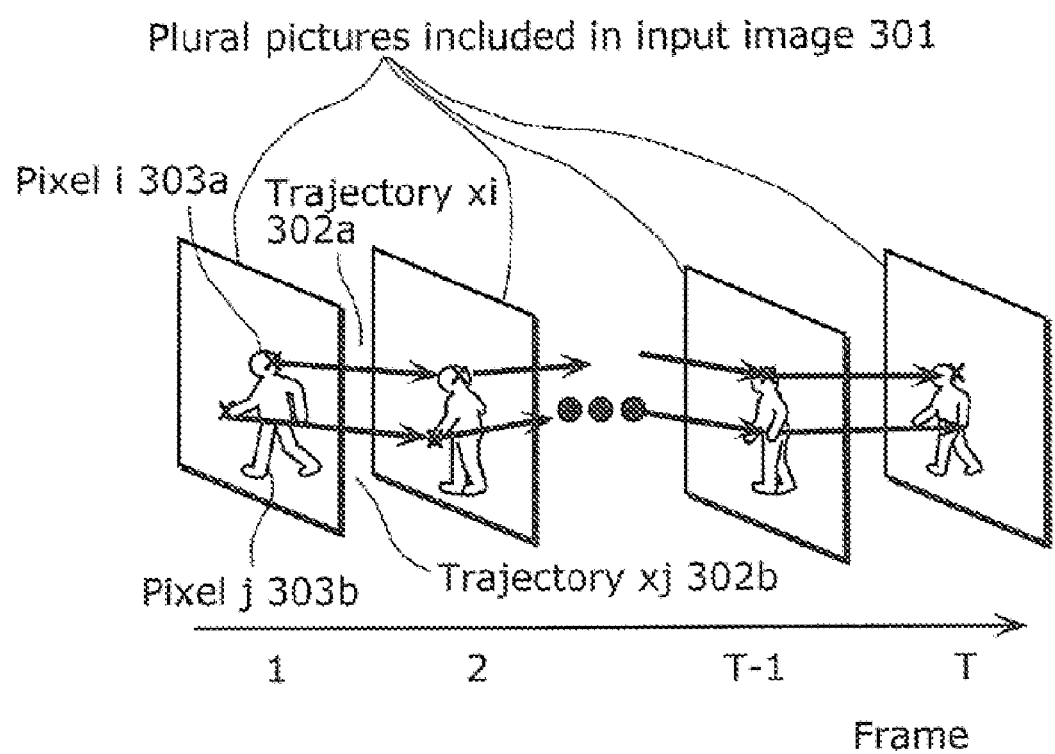
FIG. 6 is a diagram which shows an example of trajectories.

FIG. 6 is a diagram which shows an example of trajectories x. The trajectory x is a vector made up of a group of the pixel coordinates calculated from the motion information 302 that is the motion information towards the other pictures, corresponding to the pixel i303, in an input image 301 starting from time t to time t+(T−1).

Next, in the distance calculating step S203, the distance calculating unit 103 calculates a distance between the trajectories (here, the average of Euclidean distance) using an input of plural trajectories. The distance f(i, j) between the trajectory of the pixel i and the trajectory of the pixel j can be calculated using the Expression 2 below.

[Math. 2]

$$f(i, j) = \frac{1}{T}\sum_{t=1}^{T} d_{ij}^t, \quad \text{(Expression 2)}$$

where $$d_{ij}^t = \sqrt{(x_t^i - x_t^j)^2 + (y_t^i - y_t^j)^2}$$

It is to be noted that, in the present embodiment, a distance f between trajectories is called a linear distance so as to be discriminated in description from a geodetic distance g described below, however, the definitional identity of the linear distance is not limited to linear operation, and nonlinear operation may be included in the definitional identity of the linear distance.

It is to be noted that the following Expression 3 may be used as the expression for calculating the linear distance f(i, j), instead of the above-described Expression 2.

[Math. 3]

$$f(i, j) = ptn_{ij} + w \cdot mtn_{ij}, \quad \text{(Expression 3)}$$

where $$ptn_{ij} = \frac{1}{T}\sum_{t=1}^{T} d_{ij}^t$$

$$mtn_{ij} = \sqrt{\frac{1}{T}\sum_{t=1}^{T} (d_{ij}^t - ptn_{ij})^2}$$

$$d_{ij}^t = \sqrt{(x_t^i - x_t^j)^2 + (y_t^i - y_t^j)^2}$$

Here, w is a weight coefficient and a parameter that is specified by a designer. The distance f(i, j) between trajectories in the above-described Expression 3 is obtained by adding, to a time average $ptn_{ij}$ of the distance between trajectories, a time variation component $mtn_{ij}$ of the distance between trajectories. The time variation component $mtn_{ij}$ of the distance between trajectories, in particular, indicates the similarity of motion of pixels. With this, it is possible to detect a change in shape of not only a rigid body whose distance relation between pixels does not temporally changes, but also a change in shape of an articulated object and the like.

Then the distance calculating unit 103 generates I×I distance matrix F as shown in Expression 4 below, using the distance f(i, j) between I trajectories calculated using the above-mentioned Expression 2 or the above-mentioned Expression 3.

[Math. 4]

$$F = \{f(i,j)\}$$ (Expression 4)

Next, in the geodetic distance calculating step S204, a distance matrix F that is a group of distances between trajectories is obtained, and the distances between trajectories are transformed to geodetic distances, using plural thresholds R which are thresholds defining the neighborhood of the trajectories. More specifically, in the geodetic distance calculating step S204, plural thresholds are obtained, and a distance in a path which passes through trajectories in the neighborhood is calculated for each of the thresholds based on the distance between the trajectories calculated in the distance calculating step S203, using the obtained plural thresholds as the threshold defining the neighborhood of the trajectories, thereby calculating the geodetic distance between the trajectories. Then plural region candidates including information of the group of trajectories of which the geodetic distance between the trajectories is finite are generated and output.

The following describes further in detail the operation of the geodetic distance calculating step S204.

First, in the geodetic distance calculating step S204, the geodetic distance calculating unit 106 performs non-linearization processing of the Expression 5 as shown below on each of the thresholds to calculate $f'_k(i, j)$, using K thresholds $R_k$ specified in advance for the distance $f(i, j)$ calculated in the above-described Expression 2.

[Math. 5]

$$f'_k(i, j) = \begin{cases} f(i, j) & \text{if } f(i, j) < R_k \\ \infty & \text{otherwise} \end{cases}$$ (Expression 5)

Next, the geodetic distance calculating unit 106 calculates a geodetic distance, using the distance $f'_k(i, j)$ that has been non-linearized. The geodetic distance is the shortest distance among the distances of all paths that are possible to connect given two points when the distance (length) of nodes connecting plural points are obtained. Thus, the geodetic distance calculating unit 106, in calculating the geodetic distance from the first trajectory to the second trajectory, calculates, as the geodetic distance, the shortest path among all of the paths that pass through one of the trajectories calculated by the distance calculating unit 103 as a relay point to reach the second trajectory from the first trajectory.

It is assumed for example that a node distance $f'_k(i, j)$ directly connecting two points of the trajectory i and the trajectory j is obtained. At this time, the path connecting between the two points of the trajectory i and the trajectory j includes a path that passes through a different trajectory s other than a node line directly connecting the two points. The distance of this path is assume to be $f'_k(i, s)+f'_k(s, j)$. The shortest distance among the distances of plural paths is assumed to be the geodetic distance $g_k(i, j)$ as shown in Expression 6 below.

[Math. 6]

$$g_k(i,j) = \min(f'_k(i,j), f'_k(i,s)+f'_k(s,j))$$ (Expression 6)

In the above-indicated Expression 6, min (x, y) is a function that returns a smaller one of the value x and the value y. Furthermore, s is a trajectory s and a relay point to pass through in order to reach the trajectory j from the trajectories i.

Here, the relay point s in $f'_k(i, s)+f'_k(s, j)$ is not limited to one point. It is to be noted that k corresponds to plural thresholds $R_k$.

As to the details of the technique for calculating the geodetic distance between multidimensional data and the technique for searching the shortest path between two points in calculating the geodetic distance as described above, a detailed explanation for the processing procedure is omitted here because ISOMAP disclosed in Non Patent Literature 3, Dijkstra method disclosed in Non Patent Literature 4, and so on are widely known, for example.

(Non Patent Literature 3) Joshua Tenenbaum, Vin de Silva, John Langford, "A Global Geometric Framework for Nonlinear Dimensionality Reduction", Science, VOL290, pp. 2319-2322, 22 December, 2000

(Non Patent Literature 4) E. W. Dijkstra, "A note on two problems in connexion with graphs", Numerische Mathematik, pp. 269-271, 1959

Furthermore, the region candidate generating unit 107 generates a matrix $G_k$ of I×I geodetic distance as shown in Expression 7 indicated below, based on the geodetic distance $g_k(i,j)$ between I trajectories calculated in the above-indicated Expression 6.

[Math. 7]

$$G_k = \{g_k(i,j)\}$$ (Expression 7)

Through the processing described above, in the geodetic distance calculating step S204, the geodetic distance calculating unit 106 generates K geodetic distance matrices $G_k$ corresponding to K thresholds $R_k$.

Figure 7:
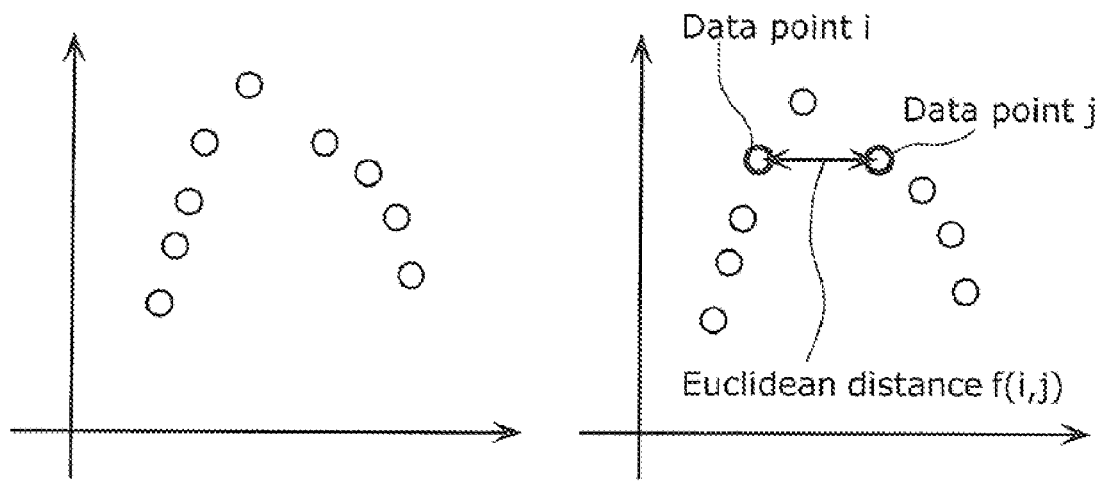
FIG. 7(*a*) to (*c*) is a conceptual diagram which shows calculation processes of a geodetic distance.

Here, the processing of non-linearization and calculating geodetic distance as shown in the above-indicated Expression 5 and Expression 6 will be described with reference to the conceptual diagram in FIGS. 7(a) to 7(c). First, FIG. 7(a) shows the data distribution of the trajectory x as shown in the above-indicated Expression 1, as a two-dimensional data distribution for convenience of explanation. Here, each data point corresponds to the trajectory of the pixel i shown in Expression 1 above. The relationship of the distance $f(i, j)$ obtained by the Expression 2 above is shown in FIG. 7(b). A distance between a data point i and a data point j is smaller than a distance between the data point i and a data point s. On the other hand, when performing the geodetic distance transformation shown in Expression 5 and Expression 6, the distance $g(i, j)$ between the data point i and the data point j becomes a distance which passes through the data points including the relay data point s as indicated by an arrow, as shown in FIG. 7(c). As a result, unlike the case of using the distance $f(i,j)$, the distance $g(i,j)$ between the data point i and the data point j becomes larger than the distance $g(i, s)$ between the data point i and the data point s.

Next, the characteristics of the geodetic distance transformation indicated in Expression 5 and Expression 6 above are described with reference to the conceptual diagram in FIGS. 8(a) and (b). Here, in order to clearly describe the difference between the linear distance $f(i, j)$ and the geodetic distance $g(i, j)$, the distance between trajectories at time t, as shown in Expression 2 above, is given as an example. FIG. 8(a) is an example of the linear distance $f(i, j)$. For example, a distance between a head-region pixel i502 and a finger-region pixel j503 becomes a distance indicated by a distance 501. On the other hand, when the threshold $R_k$ is properly set, the distance between the head-region pixel i502 and the finger-region pixel j503 becomes a distance that is a summation of distances indicated by an arrow passing through a pixel j504 to the pixel j, as shown in FIG. 8(b), by performing the geodetic distance transformation as indicated in Expression 5 and Expression 6 above.

Thus, whereas the distance 501 as shown in FIG. 8(a) cannot continuously represent, as the data, the shape of an object articulated with joints like a person, the geodetic distance shown in FIG. 8(b) can express, as distance, continuity of such a shape articulated with joints.

Furthermore, the linear distance between the head-region pixel i502 and the finger-region pixel j503 in FIG. 8(a) temporally changes its value to a great extent, in the case where the positional relationship temporally changes to a great extent, according to a change in a posture of a person. The geodetic distance $g_k(i,j)$ between the two same trajectories is characterized by having a change smaller than a linear distance, because the geodetic distance $g_k(i, j)$ is a sum of distances between other trajectories having a similar motion.

Furthermore, as to two trajectories on moving objects having motion significantly different from each other as in the two people in FIG. 4 and FIG. 5, the linear distance between trajectories becomes a large value and the geodetic distance becomes a further large value.

From the above, it can be said that in the case where an moving object that moves changing shape like a person is targeted, the geodetic distance is more suitable than the linear distance for extracting a region of the moving object based on the distance of the trajectory.

It is to be noted that, in the geodetic distance calculating step S204, a technique using the Expression 5 and the Expression 6 above is described as a technique for obtaining a geodetic distance from a linear distance, however, the technique for obtaining a geodetic distance is not limited to this technique.

For example, K thresholds $N_k$ specified in advance are used instead of K thresholds $R_k$ specified in advance. Then, as the processing for obtaining the distance $f'_k(i, j)$ that has been non-linearized from a linear distance $f(i, j)$, the non-linearized distance $f'_k(i, j)$ may be calculated by replacing, with an infinite value, the linear distance larger than the $N_k$-th linear distance from the smallest among the linear distance $f(i, j)$ between a trajectory i and other (I–1) trajectory, instead of the Expression 5 above that replaces, with an infinite value, the linear distance $f(i, j)$ equal to or more than a threshold $R_k$.

Next in the region candidate generating step S205, the region candidate generating unit 107 performs clustering on K geodetic distance matrices $G_k$ corresponding to K thresholds $R_k$ calculated by the geodetic distance calculating unit 106 by integrating continuous trajectories in each of the geodetic distance matrices $G_k$ and adds information of a cluster label θ and the number of the clusters. It is assumed here that two trajectories being continuous means that the geodetic distance $g_k(i, j)$ between the trajectory i and the trajectory j is finite (not infinite).

The following describes an example of clustering using the geodetic distance obtained for K thresholds $R_k$, with reference to FIG. 9 (a) to (e). Here, FIG. 9(a) is diagram which shows an example of I trajectories obtained from input of T pictures having two people as the moving object. It is to be noted that eight trajectories including a to h are shown in the diagram, however, the number of trajectories is not limited according to the present invention, and it is preferable to include trajectories as many as possible. FIG. 9(b) is a conceptual diagram of the higher-dimensional space, which shows the trajectories shown in FIG. 9(a). Although it is shown as a three-dimensional space for easier description, it depends on the number of the parameters determining the distance between trajectories in practice, and thus it is not necessarily the three-dimensional. Here, each point in the higher-dimensional space including trajectories (FIG. 9(b)) is associated with a corresponding one of the trajectories shown in Expression 1 above. Furthermore, a distance between points on the higher-dimensional space (FIG. 9(b)) corresponds to the distance $f(i, j)$ of the Expression 3 above. In the case where the thresholds $R_k$ are sufficiently large, for example, where the thresholds $R_k$ are larger than a maximum value of $f(i, j)$ in Expression 6 above, the geodetic distance $g_k(i, j)$ as shown in FIG. 9(c) becomes a finite distance in every combination of i and j by the non-linearization as shown in Expression 5. That is, since there is no discontinuity point, the cluster becomes a single cluster $θ_1^1$. On the other hand, in the case where the thresholds $R_k$ are sufficiently small, more specifically, where the thresholds $R_k$ are smaller than a minimum value of $f(i, j)$ in Expression 5 above, the geodetic distance $g_k(i, j)$ becomes infinite in every combination of i and j by the non-linearization as shown in Expression 5. That is, the number of clusters is equal to I that is the number of trajectories. Thus, it is possible to obtain information of clustering having a different number of clusters of at least one and equal to or smaller than I using the geodetic distance matrices, that is, candidates for region extraction of the moving object, by setting the thresholds $R_k$ as values between the maximum value and the minimum value of the $f(i, j)$ and calculating plural geodetic, distance matrices.

The following describes an example of clustering in the case where the threshold $R_k$ is set to be a value between the maximum and minimum of $f(i, j)$ as shown in FIG. 9(d). It is assumed that $f(d, e) > f(e, g)$ when the distance between the trajectory a and the trajectory b is assumed to be $f(a, b)$ in FIG. 9(b). Here, when the threshold is set to be $R_1$, the distance $f(d, e)$ is assumed to be a value greater than the threshold $R_1$, that is, $f(d, e) > R1$. In this case, $g_1(d, e)$ becomes infinite by the non-linearization as shown in Expression 5, even when the geodetic distance is calculated using Expression 6 above. Accordingly, the region candidate generating unit 107 determines that it is discontinuous between the trajectories d and the trajectories e. As a result, since the geodetic distances between the trajectories a, b, c, and d do not pass through a discontinuity point, the value of the geodetic distances become finite and the geodetic distances from the trajectories a, b, c, and d to the trajectories e, f, g, and h all become infinite. As described above, the region candidate generating unit 107 determines that the groups of trajectories having finite geodetic distances are in the same cluster and the groups of trajectories having infinite geodetic distances are in a different cluster. With this, the cluster $θ_1^1$ (the group of a, b, c, d, e, f, g, and h) can be separated into two clusters of $θ_1^2$ (the group of e, f, g, and h) and $θ_2^2$ (the group of a, b, c, and d). Furthermore, when the threshold $R_2$ is assumed to be $R_1 > R_2 > f(e, g)$, it is assumed that $g_1(d, e)$ does not change (in other words, remains infinite) and $g_2(e, g)$, $g_2(e, h)$, $g_2(f, g)$, and $g_2(f, h)$ become infinite, as shown in FIG. 9 (e). Then the region candidate generating unit 107 determines that the discontinuity points are present between the trajectories e and g, between the trajectories e and h, between the trajectories f and g, and between the trajectories f and h and classifies groups having an infinite geodetic distance and groups not having an infinite geodetic distance as in the case shown in FIG. 9(d), to separate the groups into a total of three clusters $θ_1^3$ (the group of g and h), $θ_2^3$ (the group of a, b, c, and d), and $θ_3^3$ (the group of e and f). With the processing described above, it is possible to determine that the groups of trajectories not having an infinite geodetic distance are continuous and thus belong to the same cluster, and to separate into clusters based on the discontinuity point by determining that the groups of trajectories having infinite distance are discontinuous.

It is to be noted that, as to the method of setting the thresholds $R_k$, K thresholds at equal intervals from the minimum value to the maximum value of $f(i, j)$ may be set or a value increased or decreased at a given interval centering on an average value or a median of f(i, j) may be used.

With the processing described above, the region candidate generating unit 107 generates information of label $\theta_k^m$ of a cluster which indicates a continuous trajectory and a number of clusters $M_k$, in accordance with K geodetic distance matrices $G^k$, in the region candidate generating step S205. In the subsequent steps, information of each cluster associated with a corresponding one of the geodetic distance matrices is handled as region candidates that are plural candidates indicating regions of a moving object in a picture.

Next, in the interregional geodetic distance calculating step S206, the interregional geodetic distance calculating unit 108 calculates interregional geodetic distances corresponding to the region candidates, using, as an input, information of the region candidates generated in the region candidate generating step S205, that is, K geodetic distance matrices $g_k(i, j)$ and the cluster label $\theta_k^m$ and the number of clusters $M_k$ which correspond to the K geodetic distance matrices $g_k(i, j)$.

The following describes further in detail the operation of the interregional geodetic distance calculating unit 108 in the interregional geodetic distance calculating step S206.

First, in the interregional geodetic distance calculating step S206, the interregional geodetic distance calculating unit 108 arbitrarily selects one from the geodetic distance matrices $g_k(i, j)$ corresponding to K thresholds $R_k$ for each of the number of clusters M (M is equal to or more than two) and determines the selected one as a representative geodetic distance matrix $G^M$ that represents the number of clusters M. In Embodiment 1, as a method for selecting a representative geodetic distance matrix, the geodetic distance matrix having the highest threshold $R_k$ from among the plural geodetic distance matrices having M clusters is assumed to be selected.

Next, the interregional geodetic distance calculating unit 108 arbitrarily selects one from among plural geodetic distance matrices having fewer clusters following M with respect to the representative geodetic distance matrix $G^M$ having M clusters and specifies the selected one as a reference matrix $Gr^M$ having M clusters. In Embodiment 1, as a method for selecting a reference matrix, the geodetic distance matrix having the lowest threshold $R_k$ from among the plural geodetic distance matrices having fewer clusters following M is assumed to be selected.

An example of the geodetic distance matrix $G_k$ and the representative geodetic distance matrix $G^M$ generated in the interregional geodetic distance calculating step S206 is shown in FIGS. 10(a) to 10(f). FIG. 10(a) is a diagram which shows an example of a geodetic distance matrix $G_k$ obtained for K thresholds $R_k$. The geodetic distance matrix is a matrix of I×I geodetic distances having the geodetic distance $g_k(i, j)$ of the trajectory as being an element of i row and j column. FIGS. 10(b) to 10(d) respectively show an example of the representative geodetic distance matrix $G^M$ having 1 to 3 clusters. Here, the trajectories corresponding to the row and column of the representative geodetic distance matrix in FIGS. 10(b) to 10(d) are all assumed to be common.

FIG. 10(b) and FIG. 9(c), FIG. 10(c) and FIG. 9(d), and FIG. 10(d) and FIG. 9(e), are the conceptual diagrams of the representative geodetic distance matrix and the higher-dimensional space of distances of trajectories when the number of clusters is one to three, respectively.

The diagonal line rectangular areas in FIG. 10 (b) to (d) have finite values, which indicates that the corresponding trajectory is continuous and included in one cluster. Furthermore, the areas other than the diagonal line areas in the diagram indicate that the distance is infinite and the corresponding trajectory is discontinuous. Accordingly, M clusters (M diagonal line areas) having finite distances are arranged in a diagonal portion corresponding to the number of clusters M.

FIGS. 10(e) and (f) is a diagram which shows an example of the reference matrix. The reference matrix having M clusters is selected from geodetic distance matrices having largest number of clusters in less than M clusters. For that reason, an infinite element in the representative geodetic distance matrix is a finite value in some part of the reference matrix The following describes in detail information included in the representative geodetic distance matrix and the reference matrix which have M clusters, with reference to FIG. 11(a) to (d).

FIGS. 11(a) and (b) show the representative geodetic distance matrix (FIG. 11(a)) and the reference matrix (FIG. 11(b)), respectively, in the case where number of clusters is two (M=2). It is assumed that the clusters of the reference matrix corresponding to the clusters $\theta_1^2$ and $\theta_2^2$ of the representative geodetic distance matrix are $\theta_1^2$ and $\theta_2^2$ in the same manner (two diagonal line areas as shown in FIG. 11(b)). Furthermore, a region of an element having a value which is infinite in the representative geodetic distance matrix and finite in the reference matrix is assumed to be $\theta_{1,2}^2$ (two vertical line areas in FIG. 11(b)).

At this time, the region $\theta_1^2$ of the reference matrix represents the distance between trajectories in the cluster $\theta_1^2$ and the region $\theta_2^2$ represents the distance between trajectories in the cluster $\theta_2^2$, respectively. Furthermore, two regions $\theta_{1,2}^2$ in the reference matrix represents the distance between trajectories that exist in different clusters $\theta_1^2$ and $\theta_2^2$. From the above, it can be said that the degree of variation in distribution of the cluster $\theta_1^2$ can be represented using the average value of distances in the reference matrix $\theta_1^2$ and that the degree of variation in distribution of the cluster $\theta_2^2$ can be represented using the average value of distances in the reference matrix $\theta_2^2$. Furthermore, the distance between the clusters $\theta_1^2$ and $\theta_2^2$ can be represented using the average value of the distance in the reference matrix $\theta_{1,2}^2$.

The same also applies to the case where the number of clusters is other than two. The same relationship as above is established between the clusters $\theta_1^3$ and $\theta_3^3$ of the representative geodetic distance matrix and the reference matrix $\theta_{1,3}^3$ also in the examples of the representative geodetic distance matrix (FIG. 11(c)) and the reference matrix (FIG. 11(d)) in the case of three clusters (M=3), for example.

In the interregional geodetic distance calculating step S206, the interregional geodetic distance calculating unit 108 calculates an interregional geodetic distance that is an index value of the distance between clusters, using the information included in the representative geodetic distance matrix and the reference matrix as described above.

To be more specific, a region $\theta_{p,q}^M$ and clusters $\theta_p^M$ and $\theta_q^M$ which correspond to an element that is infinite in a representative geodetic distance matrix $G^M$ and finite in a reference matrix $Gr^M$ are extracted using the representative geodetic distance matrix $G^M$ and the reference matrix $Gr^M$ having M clusters.

Then, the interregional geodetic distance calculating unit 108 calculates the interregional geodetic distance $h_{p,q}^M$ between the clusters $\theta_p^M$ and $\theta_q^M$ using Expression 8 below.

[Math. 8]

$$h_{p,q}^{M} = \frac{1}{2}\left(\frac{\bar{g}_{p,q}^{M}}{\bar{g}_{p}^{M}} + \frac{\bar{g}_{p,q}^{M}}{\bar{g}_{q}^{M}}\right),$$ (Expression 8)

where $$\bar{g}_{p}^{M} = \frac{1}{n_p \times (n_p - 1)} \sum g^{M}(i,j), \quad i, j \in \vartheta_{p}^{M}, \quad i \neq j,$$

$n_p$: the number of trajectories of $\theta_p^M$ $$\bar{g}_{q}^{M} = \frac{1}{n_q \times (n_q - 1)} \sum g^{M}(i,j), \quad i, j \in \vartheta_{q}^{M}, \quad i \neq j,$$

$n_q$: the number of trajectories of $\theta_q^M$ $$\bar{g}_{p,q}^{M} = \frac{1}{n_p \times n_q} \sum g^{M}(i,j), \quad i \in \vartheta_{p}^{M}, j \in \vartheta_{q}^{M},$$

In Expression 8 above, g-$^M_p$ is an average value of the geodetic distance between plural trajectories in the cluster $\theta_p^M$ among two clusters $\theta_p^M$ and $\theta_q^M$ corresponding to two region candidates. Likewise, g-$^M_q$ is an average value of the geodetic distance between plural trajectories in the cluster $\theta_q^M$. g-$^M_{p,q}$ is an average value of the geodetic distance between trajectories existing in the cluster $\theta_p^M$ and trajectories existing in the cluster $\theta_q^M$. $n_p$ and $n_q$ are the number of trajectories belonging to the clusters $\theta_p^M$ and $\theta_q^M$.

It is to be noted that each of the g-$^M_p$, g-$^M_q$, g-$^M_{p,q}$ may be calculated using the reference matrix Gr$^M$, or g-$^M_p$ and g-$^M_q$ may be calculated using the representative geodetic distance matrix G$^M$, and g-$^M_{p,q}$ may be calculated using the reference matrix Gr$^M$.

In the interregional geodetic distance calculating step S206, the interregional geodetic distance calculating unit 108 performs the processing described above on all of the calculated number of clusters other than 1 among M clusters, calculates and outputs an interregional geodetic distance $h_{p,q}^M$, respectively, together with corresponding clusters $\theta_p^M$ and $\theta_p^M$ (label information of the trajectories) as region candidates.

It is to be noted that the region of $\theta_{p,p}^M$, $\theta_p^M$, and $\theta_p^M$ described above is not limited to one group for one representative geodetic distance matrix G$^M$ and the reference matrix Gr$^M$ having M clusters. In the case where more than one group exists, the interregional geodetic distance is also calculated using the processing as shown in Expression 8 above.

Here, the property of the interregional geodetic distance as shown in Expression 8 above is explained. From Expression 8 above, the interregional geodetic distance is a value obtained by normalizing g-$^M_{p,q}$ that is an average value of the geodetic distance between trajectories belonging to two different region candidates by g-$^M_p$ and g-$^M_q$ that are average values of the geodetic distance between trajectories in the same region candidate. In other words, the interregional geodetic distance is a value obtained by normalizing an index value indicating the distance between region candidates by an index value indicating the variation in the region candidates. Therefore, the interregional geodetic distance qualitatively has the following properties: •the greater the distance between two region candidates is, the greater the interregional geodetic distance becomes; •the interregional geodetic distance becomes constant when the size of the entire trajectory (enlarging and reducing rate) changes; and •there is very little change in the interregional geodetic distance even when the distance between trajectories in the region candidates changes due to a change in a moving object.

As described above, the interregional geodetic distance calculating unit 108 calculates, for each of the plural thresholds, an interregional geodetic distance by performing a predetermined calculation, as a similarity between two region candidates in a first region candidate set among plural region candidate sets generated in the region candidate generating step S205, using the representative geodetic distance that is a geodetic distance in the two region candidates and the reference geodetic distance that is a geodetic distance in the second region candidate including region candidates by a total number next smaller to a total number of the region candidates included in the first region candidate set. That means the geodetic distance between region candidates included in the reference geodetic distance matrix is normalized by the geodetic distance in each of the regions of the region candidates included in the representative geodetic distance matrix. In other words, an index value that indicates a distance between two region candidates and an index value that indicates a variation in each of the region candidates are calculated based on the reference geodetic distance and the representative geodetic distance, and the index value that indicates the distance is normalized by operation using the index value that indicates the variation, thereby calculating the interregional geodetic distance.

It is to be noted that at least one region candidate among plural region candidates generated in the region candidate generating step S205 may be a region candidate having one trajectory belonging thereto. In this case, in the interregional geodetic distance calculating step S206, it is sufficient to output the geodetic distance of the one trajectory and a given one trajectory belonging to the other region candidate as an interregional geodetic distance between the region candidate having one trajectory belonging thereto and the other region candidate.

Next, in the region candidate selecting step S207, the region candidate selecting unit 109 determines, as region candidates, plural clusters $\theta_p^M$ and $\theta_q^M$ generated by the region candidate generating unit 107, uses the interregional geodetic distance $_{p,q}^M$ calculated by the interregional geodetic distance calculating unit 108 as an evaluation value for the plural clusters $\theta_p^M$ and $\theta_q^M$, and selects whether or not the region candidates of the clusters $\theta_p^M$ and $\theta_q^M$ are to be segmented as different clusters based on the interregional geodetic distance.

To be more specific, in the case where the interregional geodetic distance $h_{p,q}^M$ is greater than a predetermined threshold Ht, two corresponding clusters $\theta_p^M$ and $\theta_q^M$ are selected as clusters having a sufficient distance between the regions and determined as individual clusters. On the other hand, in the case where the interregional geodetic distance $h_{p,q}^M$ is smaller than a predetermined threshold Ht, two corresponding clusters $\theta_p^M$ and $\theta_q^M$ are determined as the same cluster. More specifically, it is determined not to segment in this case. Then, after determining whether or not to segment for all of the clusters of the region candidates, a different label $\theta_m$ is assigned to a trajectory belonging to a different cluster, and outputs as clustering information of the trajectory.

It is assumed for example that an interregional geodetic distance calculated using the representative geodetic distance matrix having two clusters as shown in FIG. 11(a) and the reference matrix as shown in FIG. 11(b) is $h_{1,2}^2$, an interregional geodetic distance calculated using the representative geodetic distance matrix having three clusters as shown in FIG. 11(c) and the reference matrix as shown in FIG. 11(d) is $h_{1,3}{}^3$, and another interregional geodetic distance having w clusters is $h_{p,q}{}^w$. Here, assuming that $h_{1,2}{}^3$>Ht, $h_{1,3}{}^3$, $h_{p,q}{}^w$<Ht, corresponding clusters $\theta_1{}^2$ and $\theta_2{}^2$ are segmented accordingly, and other clusters are not segmented (that is, $\theta_1{}^2$ is not segmented further to $\theta_1{}^3$, $\theta_3{}^3$). As a result, the trajectories are segmented to two clusters of the clusters $\theta_1{}^2$ and $\theta_2{}^2$, and the same result of clustering as in FIG. 9(d) is obtained.

Finally, in the image outputting step S208, the output unit 105 generates an image using the clusters $\theta_1{}^2$ and $\theta_2{}^2$ of trajectories to be displayed on the display 120.

Here, in the image outputting step S208, the output unit 105 selects different colors for I trajectories depending on the corresponding clusters $\theta_1{}^2$ or $\theta_2{}^2$, and draws a pixel at T-th image coordinate position using the selected color, thereby generating an image.

Figure 12:
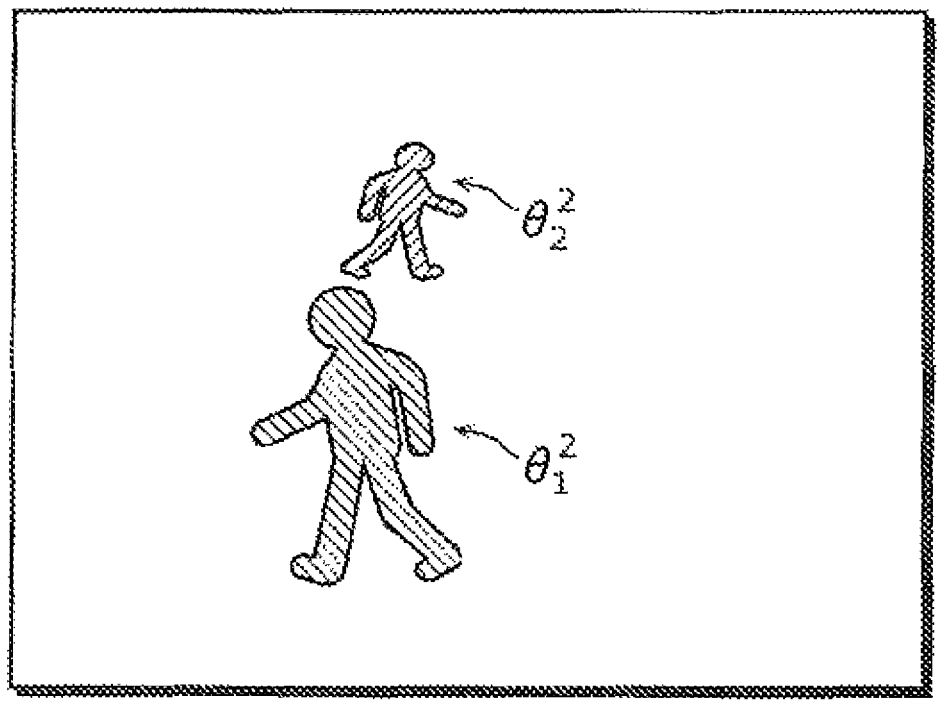
FIG. 12 is a diagram which shows an example of an image generated in an image outputting step.

FIG. 12 shows an example of the image generated in the image outputting step S208. An image is displayed which has a different color for each of the trajectories that have been clustered.

It is to be noted that, pixels at image coordinate positions of I trajectories are drawn with a color corresponding to the cluster as a procedure for generating an image based on I trajectories that have been clustered in the image outputting step S208, however, the method of generating an image is not limited to this.

To be more specific, it is possible to draw all of the pixels in the image with a color corresponding to the cluster with the above-described method as long as the number of trajectories I and the number of pixels in the entire image are the same. On the other hand, in the case where the number of trajectories I is smaller than the number of pixels in the entire image, a pixel that does not match an image coordinate position of any trajectories exists. Such a pixel that does not match an image coordinate position of any trajectories may be drawn with a different method.

For example, in the motion analysis unit 102, a pixel that belongs to a block used for motion estimation for generating a trajectory may be drawn by the same color as a cluster of the trajectory.

In addition, as another method of drawing a pixel that does not match an image coordinate position of any trajectories, the color same as the cluster of the trajectory positioned closest may be used for the drawing.

Furthermore, as yet another method of drawing a pixel that does not match an image coordinate position of any trajectories, image coordinate positions (points) of plural trajectories may be connected by Delaunay triangulated mesh generating method, and a pixel included in a triangle surrounded by three points belonging to the same cluster may be drawn with the color same as the cluster.

It is to be noted that, in the case of processing for continuous video images, the region of a moving object is segmented and extracted for each region having a different motion by repeating the operation of the above-mentioned steps S201 to S208.

As described above, the moving object detection apparatus according to the present embodiment performs clustering on trajectories based on the distance between the trajectories, that is, the similarity between the trajectories. As a technique of clustering, geodetic distance transformation is performed on a distance between trajectories, using different threshold R and, as a result, a candidate for segmentation is obtained. Furthermore, a new index value that is an interregional geodetic distance is introduced for the candidate for segmentation and whether or not to segment is determined based on the index value.

Here, there is an advantageous effect regarding the interregional geodetic distance that the interregional geodetic distance becomes constant even when the size (enlarging and reducing rate) of the entire trajectory changes, as described above. Accordingly, the interregional geodetic distance is less likely affected by change in a size even in the case where the size of a moving object in a picture changes (the case of zooming in image capturing by a camera or the case where the moving object is approaching), and thus region extraction of the moving object is expected to be carried out accurately even when a moving object whose size changes is included.

As described above, with the moving object detection apparatus and method according to the present embodiment, it is possible to perform region extraction of a moving object in an image irrespective of the posture of an articulated object, as a result of temporally pursuing a region of the object moving in the image, by performing clustering based on the similarity between the trajectories in the image. Furthermore, since it is not necessary to set a human candidate region as preprocessing, no failure occurs in region extraction due to an error in detecting the human candidate region. As described above, by performing clustering based on the interregional geodetic distance without requiring fitting of a vast quantity of parameters, it is possible to stably perform region extraction of an image including a human or the like that moves changing shape, thereby detecting the moving object in the image.

It is to be noted that the moving object detection apparatus and method according to an implementation of the present invention is not limited to the embodiment described above, but includes an embodiment obtained by modifying the above-described embodiment by those skilled in the art and an embodiment obtained by arbitrarily combining components in all the embodiments and variations described thus far.

(Modification 1 of Embodiment 1)

In the region candidate selecting step S207 of the moving object detection apparatus according to Embodiment 1, for example, the threshold Ht is assumed to be specified in advance, however, this is not limited to this. More specifically, the threshold Ht may be changed according to the size of the motion of a moving object that is a target of region extraction, or may be changed according to whether the moving object is a person or a vehicle.

The threshold Ht is equivalent to evaluation criteria for determining whether two region candidates are different regions or the same region. In the case where two region candidates correspond to two moving objects, respectively, for example, the region candidates can be extracted as two different regions by reducing the threshold Ht, even when the difference in a relative position or motion of the two moving objects is small. On the other hand, it is possible to extract the region candidates as two regions only when the relative position or motion of the two moving objects is great, by increasing the threshold Ht. Therefore, there is an advantageous effect that the target for region extraction can be changed according to the size of the value of the threshold Ht.

(Modification 2 of Embodiment 1)

It is to be noted that, as the operation of the region candidate generating step S205, the interregional geodetic distance calculating step S206, and the region candidate selecting step S207 of the moving object detection apparatus according to Embodiment 1, it is described that region candidates corresponding to K thresholds. $R_k$ specified in advance are generate and then a region candidate is selected based on the interregional geodetic distance from among the K thresholds R. However, the operation according to the present invention is not limited to this, and any procedure may be employed as long as the operation includes calculating an interregional geodetic distance that corresponds to region candidates and selecting a region candidate based on the calculated interregional geodetic distance.

For example, the following procedure may be adapted that generation of the region candidates, calculation of the interregional geodetic distance, and selection of the region candidate are repeatedly performed by gradually reducing the threshold R, and ended when reaching a certain condition.

Figure 13:
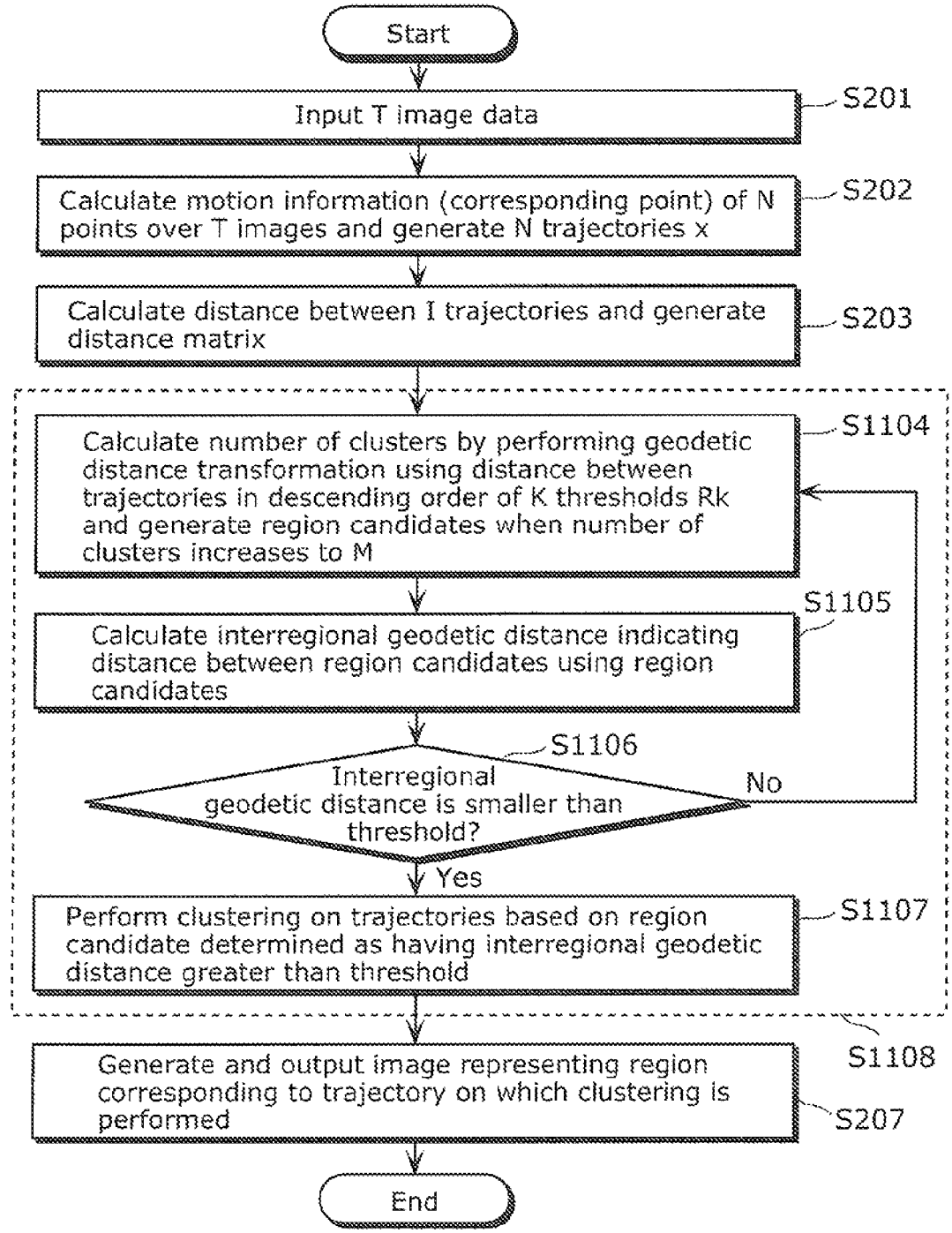
FIG. 13 is a flowchart which shows operation processes of a moving object detection apparatus according to another embodiment of the present invention.

The following describes an example of another operation in the moving object detection apparatus according to the present embodiment, with reference to FIG. 13.

In the region candidate generating step S1104, the region candidate generating unit 107 first inputs a distance matrix F that is a group of distances between trajectories, transforms the distance between trajectories to a geodetic distance with the threshold $R_0$ of a distance that defines the neighborhood of the trajectory being a initial value, and generates a geodetic distance matrix $G_0$. It is assumed here that the threshold $R_0$ is the maximum value of an element of the distance matrix F. The number of clusters becomes M=1, at this time. Next, a geodetic distance matrix Gi is generated using $R_i$ that is obtained by reducing the threshold $R_0$ at a given rate and repeats the processing until the number of clusters becomes greater than 1 (M=2, for example).

In the interregional geodetic distance calculating step S1105, the interregional geodetic distance calculating unit 108, in the same manner as in the interregional geodetic distance calculating step S206, selects the representative geodetic distance matrix $G^M$ and the reference matrix $Gr^M$ having M clusters (M=2), using the geodetic distance matrix generated in the region candidate generating step S1104 and calculates the interregional geodetic distance having M clusters (M=2).

In the region candidate selecting step S1106, the region candidate selecting unit 109 compares the interregional geodetic distance with a predetermined threshold Ht and selects whether or not to segment a region candidate as a different cluster in the case where the interregional geodetic distance is greater (S1104 to S1106).

More specifically, the region candidate selecting unit 109 repeats the processing from the region candidate generating step S1104 to the region candidate selecting step S1106 described above while making the threshold $R_k$ smaller, in the case where the interregional geodetic distance is greater than the threshold Ht, in the region candidate selecting step S1106. On the other hand, in the case where the interregional geodetic distance is smaller than the threshold Ht, the repeat processing is ended and the trajectory is clustered (S1107) and output based on the region candidate that has been selected through the repeat processing.

With the operation in the segmentation step S1108 described above, it is also possible to determine whether or not to segment a candidate for segmentation, based on the interregional geodetic distance in the same manner as in the segmentation step S209 according to the above-described embodiment. There is an advantageous effect regarding the interregional geodetic distance that the interregional geodetic distance becomes constant even when the size (enlarging and reducing rate) of the entire trajectory changes. Therefore, the interregional geodetic distance is less likely affected by change in the size even in the case where the size of a moving object in a picture changes, and thus region extraction of the moving object is expected to be carried out accurately even when a moving object whose size changes is included.

(Modification 3 of Embodiment 1)

Furthermore, whether or not two corresponding region candidates are different clusters is determined based on the size of interregional geodetic distance in the region candidate selecting step S207 according to Embodiment 1 described above, however, the criteria for selecting a region candidate according to the present invention is not limited to such a criteria, and the determination may be carried out using, for example, a temporal change of the interregional geodetic distance.

More specifically, it is assumed that the above-described steps S201 to S208 are repeatedly carried out for a new video. In this case, in the region candidate selecting step S207, the region candidate selecting unit 109 may set plural clusters $\theta_p^M$ and $\theta_q^M$ as region candidates, calculate, as an evaluation value, the temporal change of the interregional geodetic distance, that is, a difference between an interregional geodetic distance $h_{p,q}^M$ that has been newly input and an interregional geodetic distance $h_{p,q}^M$ for a corresponding cluster calculated in a previous processing, and segment the region candidates of the clusters $\theta_p^M$ and $\theta_q^M$ as different clusters in the case where the calculated difference is greater than a predetermined threshold Ht.

To be more specific, in the region candidate selecting step S207 a region candidate may be selected, based on the temporal change in the interregional geodetic distance calculated in the interregional geodetic distance calculating step S206, from among the region candidates generated in the region candidate generating step S205, to be output as a result of segmentation. In this case, two region candidates having a temporal change in the interregional geodetic distance calculated in the interregional geodetic distance calculating step S206 greater than a predetermined threshold may be selected as different regions from among the region candidates generated in the region candidate generating step S205 to be output as a result of segmentation, or two region candidates having a temporal change in the interregional geodetic distance calculated in the interregional geodetic distance calculating step S206 smaller than a predetermined threshold may be selected as the same region from among the region candidates generated in the region candidate generating step S205 to be output as a result of segmentation. Furthermore, a region candidate may be selected to be output as a result of segmentation, from among the region candidates generated in the region candidate generating step S205, based on the temporal change in the interregional geodetic distance calculated in the interregional geodetic distance calculating step S206, such that (1) two region candidates become different regions as the temporal change in the interregional geodetic distance of the two region candidates is greater, (2) two region candidates become the same region as the temporal change in the interregional geodetic distance of the two region candidates is smaller.

Furthermore, the distance calculating step and the segmentation step are repeatedly carried out for each new video, and in the region candidate selecting step S207, from among the region candidates generated in the region candidate generating step S205, all of the two region candidates having a temporal change in the interregional geodetic distance calculated in the interregional geodetic distance calculating step S206 in the repeat processing is greater than the predetermined threshold may be selected and output as a result of segmentation.

The temporal change in the interregional geodetic distance is proportional to the temporal change in a distance between clusters. Thus, two corresponding clusters have macroscopically more different motions as this value is greater. Therefore, it can be expected that is moving object regions having different motions can be accurately extracted as different clusters by selecting the region candidate based on the temporal change in the interregional geodetic distance.

Figure 8:
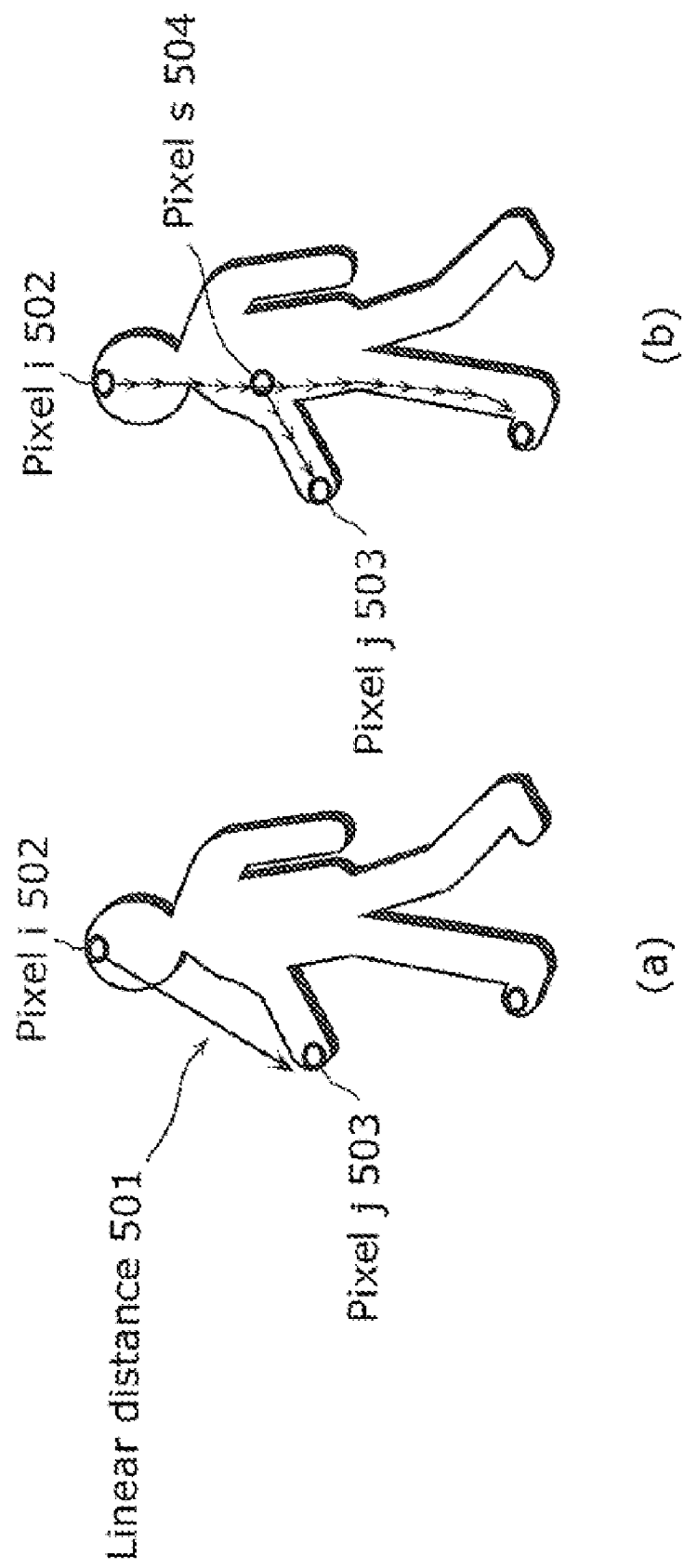
FIGS. 8(*a*) and (*b*) is a diagram which explains a feature of the geodetic distance.

Furthermore, as described with reference to FIG. 8, the geodetic distance between trajectories have characteristics described below. In two trajectories of a moving object having a change in articulated form like a person, a temporal change in a geodetic distance between trajectory is small.

With this, an interregional geodetic distance between region candidates also has characteristics described below. In two trajectories of a moving object having a change in articulated form, a temporal change in an interregional geodetic distance between region candidates is small.

As described above, in the region candidate selecting step S207 and S1307, it is possible to obtain an advantageous effect that a moving object can be accurately detected by selecting a region candidate using a temporal change in a geodetic distance between trajectories or a temporal change in an interregional geodetic distance between region candidates.

(Embodiment 2)

In the Embodiment 1 described above, the region candidate generating unit 107 generates plural region candidates based on a geodetic distance between trajectories calculated by the geodetic distance calculating unit 106, however, the method of generating the region candidate is not limited to this method, but the method of generating the region candidate may be other methods as long as it involves a technique generating plural region candidates that form a group of trajectories.

The following describes a method of generating plural region candidates based on a brightness value of a pixel in plural pictures corresponding to trajectories, as an example of the other methods of generating region candidates, with reference to drawings, in Embodiment 2 according to the present invention.

The configuration of a moving object detection apparatus 100 according to Embodiment 2 is the same as in FIG. 1. Embodiment 2 differs from Embodiment 1 in the operation of the segmentation unit 104.

Figure 14:
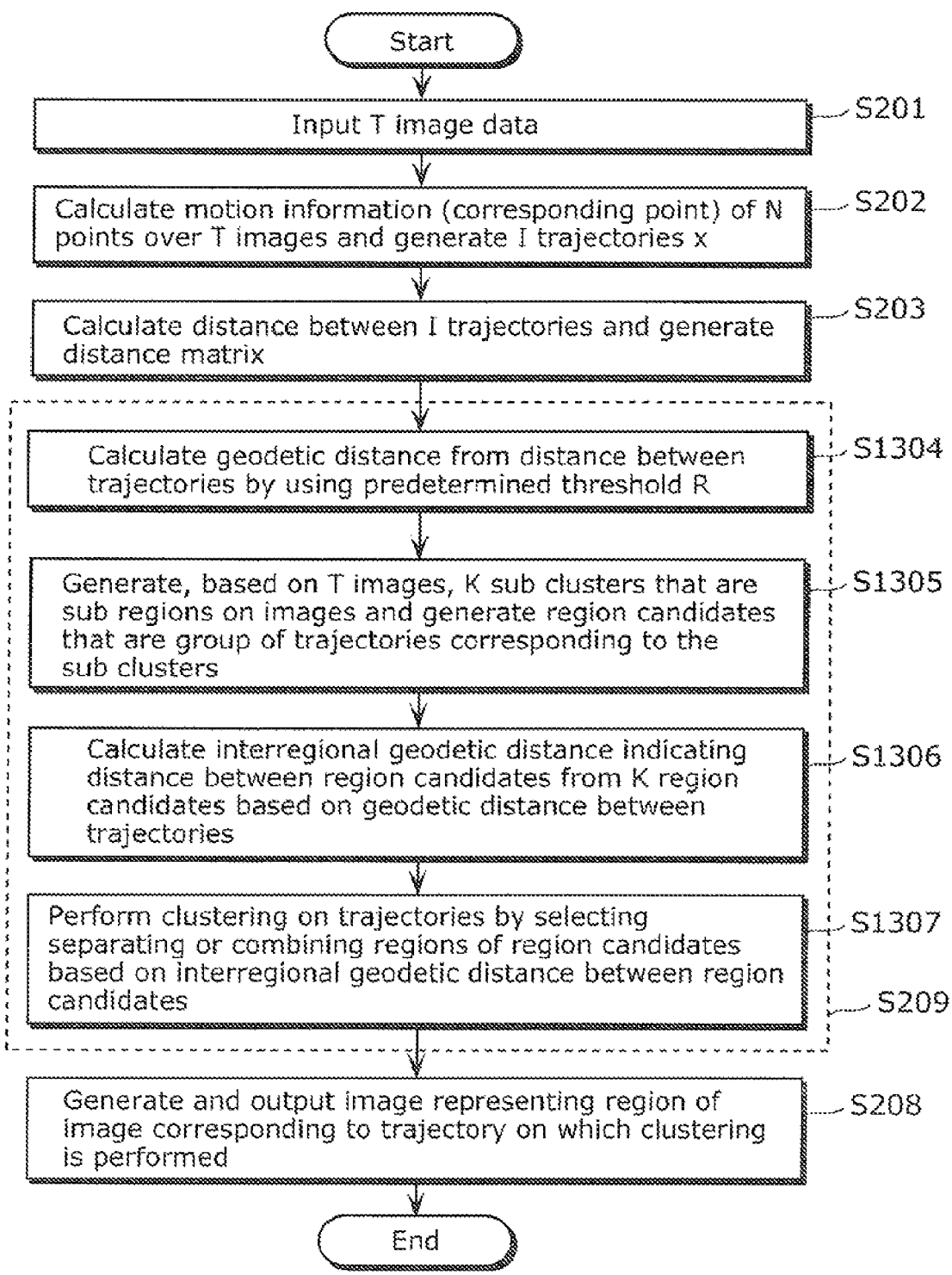
FIG. 14 is a flowchart which shows operation processes of a moving object detection apparatus according to Embodiment 2 of the present invention.

The following describes an operation of the moving object detection apparatus 100 according to Embodiment 2, with reference to FIG. 14.

FIG. 14 is a flowchart that shows an operation of the moving object detection apparatus 100 according to Embodiment 2. In FIG. 14, seven steps S201 to S203, S208, S209, and S1304 to S1307 respectively correspond to the processing units in FIG. 1. To be more specific, the image input unit 101 performs image inputting step S201, the motion analysis unit 102 performs motion analyzing step S202, the distance calculating unit 103 performs distance calculating step 203, the geodetic distance calculation unit 106 performs geodetic distance calculating step S1304, the region candidate generating unit 107 performs region candidate generating step S1305, the interregional geodetic distance calculating unit 108 performs interregional geodetic distance calculating step S1306, the region candidate selecting unit 109 performs region candidate selecting step S1307, and the output unit 105 performs image outputting step S208. The segmentation unit 104 corresponds to segmentation step S209.

According to Embodiment 2, the operations of the image inputting step S201 to the distance calculating step 203 are the same as the operations in Embodiment 1.

In the image inputting step S201, the image input unit 101 obtains plural pictures included in a video from the camera 110. It is assumed here that T pictures are obtained.

Next, in the motion analyzing step S202, the motion analysis unit 102 calculates motion information between the pictures that have been input, and generates and outputs plural trajectories. It is assumed here that I trajectories are generated.

Then, in the distance calculating step S203, the distance calculating unit 103 calculates a linear distance between the trajectories using an input of the I trajectories.

With the operations from the image inputting step S201 to the distance calculating step S203 described above, it is assumed that T pictures captured in a picture-taking situation in FIG. 4 are shown in FIG. 5 and an example of trajectories obtained from T pictures are shown in FIG. 6. Furthermore, with the image inputting step S201 to the distance calculating step S203, a distance f(i, j) between the I trajectories over T pictures is calculated and output as I×I distance matrix F.

The following describes an operation of the segmentation unit 104 according to Embodiment 2.

In the geodetic distance calculating step S1304, the geodetic distance calculating unit 106 calculates a geodetic distance g(i, j) for the linear distance f(i, j) between I trajectories calculated in the distance calculating step S203, using a predetermined threshold R according to Expression 5 and Expression 6 above. Then, a matrix G of I×I geodetic distance that is the geodetic distance g(i, j) between the I trajectories is output.

Next, in the region candidate generating step S1305, the region candidate generating unit 107 generates, based on the T pictures obtained by the image input unit, plural sub regions in the picture, and generates a region candidate that is a group of trajectories respectively corresponding to the sub regions in the generated picture.

The following describes in detail a procedure of generating region candidates based on the T pictures performed by the region candidate generating unit 107.

According to Embodiment 2, the region candidate generating unit 107 selects, from among the T pictures obtained by the image input unit, one picture that is the T/2-th picture positioned in the middle in time order. Next, the region candidate generating unit 107 segments the selected picture into plural sub regions based on a color similarity of plural pixels in the picture. It is assumed here that the picture is segmented into K sub regions.

A detailed explanation for the technique of segmenting a picture into plural sub regions based on the color similarity of pixels is omitted here as the technique described in Non Patent Literature 5 or the like can be used, for example.

(Non Patent Literature 5) Pedro F. Felzenszwalb and Daniel P. Huttenlocher "Efficient Graph-Based Image Segmentation", International Journal of Computer Vision, Vol. 59, No. 2, pp. 167-181, September, 2004

Further, the region candidate generating unit 107 outputs a group of trajectories corresponding to K sub regions, as a region candidate. More specifically, labels of K types indicating K sub regions of the selected picture are assumed to be $\theta_k$. A sub region including a pixel coordinate included in each of the trajectories is identified using the pixel coordinates in the selected picture and a label $\theta_k$ of the identified sub regions is associated with the trajectories. K region candidates to which trajectories respectively belong is represented using the label $\theta_k$ of K types respectively associated with the I trajectories obtained as described above.

FIG. 15(a) to (d) show a diagram of examples of region candidates generated by the region candidate generating unit 107. FIG. 15(a) is an example of plural trajectories a to h over T pictures calculated by the motion analysis unit 102. FIG. 15(b) shows an example of a picture in T/2-th frame selected from among the T pictures. Then FIG. 15(c) shows an example of a result of segmenting into plural sub regions based on a color similarity of pixels in the selected picture. It is assumed here that two people are respectively segmented into two regions, and thus a total of four sub regions are generated. FIG. 15(d) shows an example of region candidates generated by associating the trajectories a to h with sub regions in FIG. 15(c). The labels $\theta_1$ to $\theta_4$ of region candidates in FIG. 15(d) correspond to four sub regions in FIG. 15(c). The labels $\theta_1$ to $\theta_4$ associated with eight trajectories a to h represent region candidates to which respective trajectories belong. The region candidate generating unit 107 outputs plural region candidates generated as described above.

It is to be noted that, in the technique of segmenting a picture into plural sub regions based on a color similarity of pixels described above, a variable parameter exists in general which sets a granularity of segmentation. In Embodiment 2, the variable parameter is set so that sub regions to be generated preferably become a part of the same moving object. In other words, the variable parameter is set so that one sub region to be generated does not exist in more than one moving object.

It is to be noted that, in the result of segmenting into sub regions in FIG. 15(c), a region in the background other than the people is extracted as an individual sub region in practice, however, the region in the background is omitted for convenience of explanation using the drawing.

Next, in the interregional geodetic distance calculating step S1306, the interregional geodetic distance calculating unit 108 calculates interregional geodetic distance between K region candidates using, as inputs, information of region candidates generated in the region candidate generating step S1305, that is a geodetic distance $g(i,j)$ between I trajectories, and the label $\theta_k$ of region candidates corresponding to I trajectories.

In Embodiment 2, an interregional geodetic distance $h_{p,q}$ between two region candidates $\theta_p$ and $\theta_q$ is calculated using Expression 9 below.

[Math. 9]

$$h_{p,q} = \frac{1}{2}\left(\frac{\bar{g}_{p,q}}{\bar{g}_p} + \frac{\bar{g}_{p,q}}{\bar{g}_q}\right),$$ (Expression 9)

where $$\bar{g}_p = \frac{1}{n_p \times (n_p - 1)} \sum g(i,j), \quad i,j \in \vartheta_p, i \neq j,$$

$n_p$: the number of trajectories of $\theta_p$ $$\bar{g}_q = \frac{1}{n_q \times (n_q - 1)} \sum g(i,j), \quad i,j \in \vartheta_q, j \neq j,$$

$n_p$: the number of: trajectories of $\theta_p$ $$\bar{g}_{p,q} = \frac{1}{n_p \times n_q} \sum g(i,j), \quad i \in \vartheta_p, j \in \vartheta_q$$

In Expression 9 above, $g_{p,q}$ is an average value of geodetic distance between the trajectories belonging to the region candidate $\theta_p$ and the trajectories belonging to the region candidate $\theta_q$. $g_{p}$ and $g_{q}$ are average values of the geodetic distance between trajectories belonging to the region candidate $\theta_p$ and the geodetic distance between trajectories belonging to the region candidate $\theta_q$, respectively. $n_p$ and $n_q$ are the number of trajectories belonging to the region candidates $\theta_p$ and $\theta_q$.

The interregional geodetic distance calculating unit 108 calculates the interregional geodetic distance for each combination of the K region candidates.

Next, in the region candidate selecting step S1307, the region candidate selecting unit 109 selects separating or combining plural region candidates, based on the K region candidates generated by the region candidates generating unit 107 and the interregional geodetic distance calculated by the interregional geodetic distance calculating unit 108, thereby clustering the trajectories.

To be more specific, in the case where an interregional geodetic distance $h_{p,q}$ of two region candidates $\theta_p$ and $\theta_q$ is smaller than a predetermined threshold Ht, the region candidate selecting unit 109 performs processing of combining the two region candidates. In the case where two region candidates are combined, the region candidate selecting unit 109 replaces the label ($\theta_q$, for example) of the trajectory belonging to one of the region candidates with the label ($\theta_p$, for example) of the other region candidate.

The region candidate selecting unit 109 carries out the processing of determining whether or not to combine two region candidates described above on all of the combinations of region candidates. A resultant label associated with trajectories indicates a region to which each of the trajectories belongs, that is, a result of clustering the trajectories.

It is assumed for example that, among interregional geodetic distances between four region candidates shown in FIG. 15(d), the interregional geodetic distance $h_{1,2}$ between the region candidates $\theta_1$ and $\theta_2$ and the interregional geodetic distance $h_{3,4}$ between the region candidates $\theta_3$ and $\theta_4$ are smaller than the threshold Ht ($h_{1,2}$<Ht, $h_{3,4}$<Ht) and the interregional geodetic distance between other region candidates are greater than the threshold Ht. At this time, with the above-described operation of the region candidate selecting unit 109, the label $\theta_2$ of the trajectories c and d belonging to the region candidate $\theta_2$ is replaced with $\theta_1$ and the label $\theta_4$ of the trajectories g and h belonging to the region candidate $\theta_4$ is replaced with $\theta_3$. As a result, the plural trajectories (see FIG. 16(a)) is clustered to two regions $\theta_1$ and $\theta_3$ (see FIG. 16(b)).

Finally, in the image outputting step S208, the output unit 105 generates an image using the clusters $\theta_1$ and $\theta_3$ of trajectories to be displayed on the display 120 as in the Embodiment 1.

FIGS. 16(c) and (d) shows examples of an image of the first frame and T-th frame generated by the output unit 105. An image is displayed which has a different color for each of the trajectories that have been clustered.

As described above, the moving object detection apparatus according to the Embodiment 2 generates region candidates that are groups of trajectories and performs clustering on the trajectories based on the interregional geodetic distance calculated between region candidates.

The interregional geodetic distance has the following characteristics.

In the case where two region candidates have motions totally different from each other, the value of the interregional geodetic distance is great and temporal change is also great.

In the case where two region candidates exist on the same moving object that moves changing its shape, the value of the interregional geodetic distance is relatively small and temporal change is small (constant, ideally).

Thus, in the case where a video includes a moving object which changes its shape or size on an image due to a change of its posture or position, such as a person, it is possible to facilitate determining whether or not two region candidates are on different moving objects or on the same moving object. As a result, it is possible to perform region extraction accurately on the moving object.

The following describes the characteristics of the interregional geodetic distance described above based on a result of another experimentation. FIG. 17(a) shows an example of a video of one moving object having a change in articulated form. FIG. 17(b) shows an example of a result of experimentation of an interregional geodetic distance calculated using, as an input, the video of FIG. 17(a), for region candidates of a moving object that is divided vertically into two parts. In the experimentation, processing same as in Embodiment 2 according to the present invention is carried out on a picture of the 31st frame in FIG. 17(a) per seven frames which overlap as in 1 to 7 frames, 7 to 13 frames, ..., 25 to 31 frames.

FIG. 17(b) indicates that, when region candidates move in proximity to each other as in FIG. 17(a), the values of a linear distance and a geodetic distance between trajectories both become relatively small. Here, it is shown that the temporal change in the interregional geodetic distance (solid line) stays constant with respect to an average Euclidean distance. Thus, it is possible to facilitate determining whether two region candidates are on different moving objects or on the same moving object, by selecting a region candidate based on an index value that the temporal change is constant. As a result, it is possible to perform region extraction accurately on the moving object.

(Modification 4 of Embodiment 1 and Embodiment 2)

It is to be noted that, in Embodiment 1 and Embodiment 2 according to the present invention, the interregional geodetic distance is calculated using Expression 8 and Expression 9 above, however, the calculation is not limited to these Expressions. The interregional geodetic distance is only need to be an index value obtained by calculating an index value indicating a distance (similarity) between two region candidates and an index value indicating variation of trajectories in each of the region candidates, and normalizing the index value indicating a distance (former) using the index value (latter) indicating variation.

More specifically, as an index value $g_{p,q}$ that indicates a distance (similarity) between the two region candidates in Expression 9 above, the median of a geodetic distance between trajectories in Expression 10 below may be used.

[Math. 10]

$$\bar{g}_{p,q} = \text{median}\{g(i,j)\}, i \in \theta_p^M, j \in \theta_q^M \quad \text{(Expression 10)}$$

In Expression 10 above, median$\{g(i,j)\}$ is the median of a geodetic distance $g(i, j)$ between plural trajectories.

In addition, as indices $g_p$ and $g_q$ that indicate variation of trajectories in region candidates in Expression 9 above, variance of a geodetic distance between trajectories may be used.

(Modification 5 of Embodiment 1 and Embodiment 2)

A result of segmentation is presented on a display in Embodiment 1 and Embodiment 2 according to the present invention, however, a usage of the result of segmentation is not limited to such an application, but may be applied for example to motion estimation of the moving object. More specifically, the moving object detection apparatus according to the present invention may include a motion estimation unit in addition to the components according to the embodiments described above. That means a motion estimation unit may be included which calculates a representative trajectory from trajectories of pixels included in each of the regions based on the result of segmentation obtained by the segmentation unit 104 and estimates a motion of the moving object using the representative trajectory. To be more specific, the moving object detection apparatus according to the present invention may include a motion estimation unit that estimates a motion of a moving object by calculating the trajectory that represents the region using the trajectory included in a region identified by the segmentation unit 104, and estimating that the region moves following the calculated representative trajectory.

More specifically, when the trajectory of pixels belonging to a region $\theta_m$ is expressed as $x^{C_m}$, the motion estimation unit first calculates the representative trajectory for each cluster region $\theta_m$ as in Expression 11 below. It is to be noted that, an average trajectory is calculated as the representative trajectory in Expression 11 below, however, weighting or the like may be performed for each of the trajectories $X^{C_m}$ of pixels, or the trajectory of pixels corresponding to a cluster center on the image may be determined as the representative trajectory.

[Math. 11]

$$\bar{x}^m = \frac{1}{C_m} \sum_{c=1}^{C_m} x^{c_m} \quad \text{(Expression 11)}$$

Here, $C_m$ is the number of pixels belonging to the region $\theta_m$ or the number of trajectories of pixels.

Figure 18:
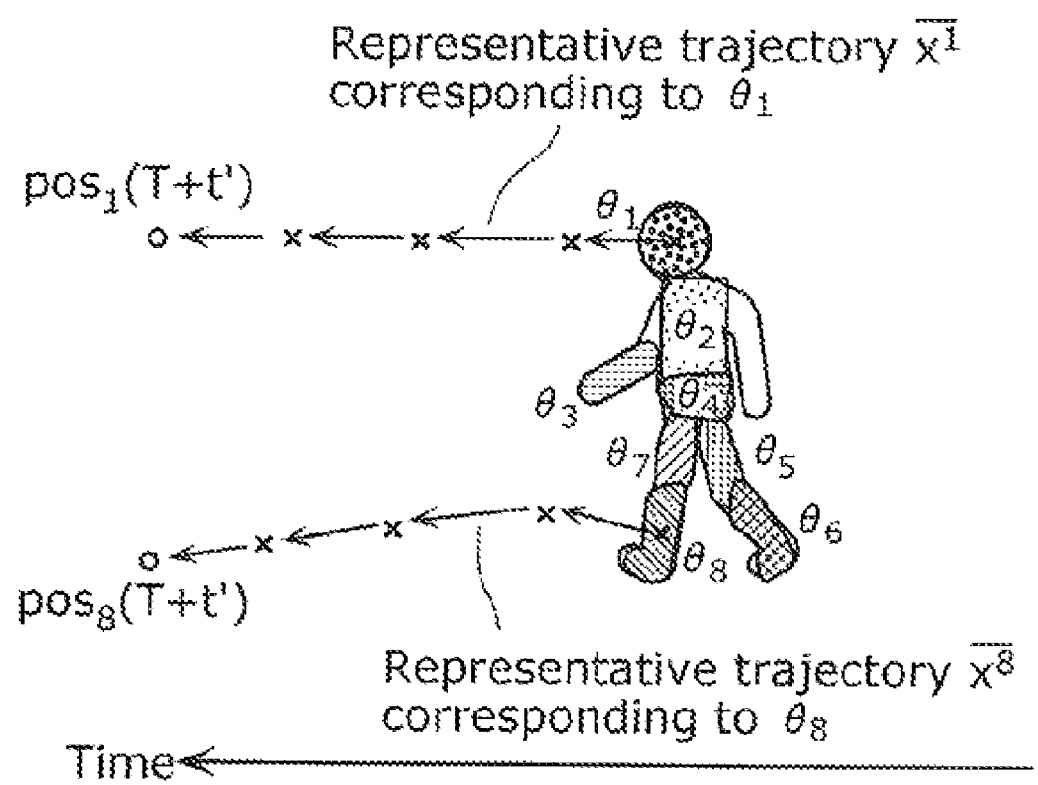
FIG. 18 is a diagram which explains motion prediction performed by a moving object detection apparatus according to yet another embodiment of the present invention.

FIG. 18 shows an example of calculating the representative trajectory for each cluster region $\theta_m$ based on Expression 11 above. However, in consideration of viewability, only the representative trajectory related to a cluster region $\theta_1$ corresponding to a head region and a representative trajectory related to a cluster region $\theta_8$ corresponding to a leg region are shown. Each x in the diagram is an element of x-$^m$ corresponding to time t and indicates a pixel position. According to the calculation method as described above, the regional division through the clustering on the nonlinear space is performed considering the similarity in pixel motion, and thus allows calculation using only the trajectories of pixels having similarity in motion; therefore, as compared to a method of simply calculating a temporal average of adjacent trajectories, it is possible to calculate the representative trajectory with higher accuracy. As described above, it is possible to represent, accurately and easily, the motion of each region by calculating the representative trajectory for each cluster region.

Next, the motion estimation unit estimates the position of the moving object at a time earlier than time T, from the representative trajectory that has been calculated. To do so, acceleration is calculated from the representative trajectory, and the position of the moving object after T+1 is estimated. When three or more time-series images are inputted, it is possible to obtain an acceleration vector $s^m$ for each representative trajectory x-$^m$ as expressed in the following expression.

[Math. 12]

$$s_{t+1}^m = \{u_{t+1}^{m1} - u_t^m\} - \{u_t^m - u_{t-1}^m\} \quad \text{(Expression 12)}$$

Here, $u_t^m$ is a motion vector and can be expressed as in the following expression.

[Math. 13]

$$u_t^m = (u_t^m, v_t^m) \quad \text{(Expression 12)}$$

By using the acceleration vector shown in Expression 12 above, it is possible to estimate, as indicated by arrows and circles in FIG. 18, a regional position $pos_m(T+t')$ of the moving object at time T+t' for each region of the moving object as shown in the following Expression 14.

[Math. 14]

$$pos_m(T+t') = pos_m(T) + t'u_T^m + \frac{1}{2}t'^2 s_T^m \quad \text{(Expression 13)}$$

Finally, the output unit 105 outputs the position of the moving object or the region of the moving object that has been predicted as described above. This allows a motion estimation considering acceleration. When the motion suddenly accelerates or stops, it is possible to estimate the position of the moving object by reflecting the acceleration of the motion. It is to be noted that an affine parameter may be used instead of the motion vector. Since the affine parameter allows representing motions including rotational movement and is suitable for representing rotation of arms or legs, it is possible to estimate, particularly, the position of an articulated object with higher accuracy.

As described above, with the moving object detection apparatus and method according to the present embodiment and modifications, it is possible to detect a moving object or a region of the moving object in an image and segment the image including the moving object irrespective of a posture of the articulated object as a result of temporally pursuing a region of the object moving in the image, by performing clustering based on a distance that indicates similarity between the trajectories associated with the pixel. Furthermore, since it is not necessary to set a human candidate region as preprocessing, no failure occurs in segmentation due to an error in detecting the human candidate region. As described above, by performing clustering in a nonlinear space without requiring fitting of a vast quantity of parameters, it is possible to accurately perform segmentation on an image including a human object that moves changing shape, to thereby detect the moving object in the image.

Thus far, the moving object detection method and the moving object detection apparatus according to the present invention have been described with use of the embodiments and the modifications thereof, the present invention is not limited to these embodiments and modifications. Other forms in which various modifications apparent to those skilled in the art are applied to the embodiments and the modifications described above, or forms structured by arbitrarily combining components of the embodiments and the modifications are included in the present invention.

In addition, the moving object detection apparatus 100 according to the embodiments described above includes the image input unit 101 and the motion analysis unit 102, however, those components are not indispensable in the present invention. More specifically, in the case where the trajectories of an image in each of the blocks included in video are calculated in advance, the moving object detection apparatus 100 may obtain such trajectories from outside and may perform processing of steps S203 to 208 on the obtained trajectories.

Furthermore, although the present invention is implemented as an moving object detection apparatus, it is obvious that the present invention can be implemented as an image processing apparatus which extracts or segments the region of an object having a motion in video as long as the function of the segmentation unit 104 is included.

INDUSTRIAL APPLICABILITY

The present invention is applicable as a moving object detection apparatus which detects a moving object in an image by performing region extraction on the image including the moving object such as a person that moves changing shape, based on motions of plural pictures, and is applicable, for example, as a moving object detection apparatus or the like to be incorporated in audio-video equipment such as a motion analyzer, a monitoring apparatus, a video camera, or a TV set.

REFERENCE SIGNS LIST

100 moving object detection apparatus
101 image input unit
102 motion analysis unit
103 distance calculating unit
104 segmentation unit
105 output unit
106 geodetic distance calculating unit
107 region candidate generating unit
108 interregional geodetic distance calculating unit
109 region candidate selecting unit
110 camera
120 display
1002 computer
1004 I/F
1005 CPU
1006 ROM
1007 RAM
1008 HDD
1009 video card

The invention claimed is:

1. A moving object detection method for detecting a moving object in video by performing segmentation on all or part of the moving object in the video, said moving object detection method comprising:
    obtaining trajectories each of which is a corresponding point between images included in the video, and calculating distances each of which indicates similarity between the trajectories, for the obtained trajectories; and
    performing segmentation by identifying a group of similar trajectories as one region, based on the distances calculated in said calculating of distances,
    wherein said performing segmentation includes:
    calculating geodetic distances between the trajectories using the distances between the trajectories calculated in said calculating of distances;
    generating region candidates using the trajectories, each of the region candidates being a group of the trajectories;
    calculating interregional geodetic distances, for the region candidates generated in said generating region candidates, based on the geodetic distances between the trajectories belonging to the region candidates, each of the interregional geodetic distances indicating similarity between the region candidates; and
    selecting, as a result of the segmentation, a region candidate having one of the interregional geodetic distances which is calculated in said calculating of interregional geodetic distances and which satisfies a predetermined condition, from among the region candidates generated in said generating region candidates.

2. The moving object detection method according to claim 1, further comprising:
capturing pictures included in the video; and
calculating the trajectories by detecting motions of an image between two temporally adjoining pictures in units of a block, and concatenating the detected motions for the pictures, the block including one or more pixels and constituting each of the pictures,
wherein in said calculating of distances, the trajectories calculated in said calculating of the trajectories are obtained and the distances are calculated.

3. The moving object detection method according to claim 1,
wherein said calculating of distances includes calculating, as a distance indicating the similarity between the trajectories, an average value of Euclidean distance between the trajectories of the images.

4. The moving object detection method according to claim 1,
wherein said calculating of geodetic distances includes, when calculating a geodetic distance from a first trajectory to a second trajectory, calculating, as one of the geodetic distances, a shortest path among all of paths that pass through, as a relay point, the trajectories obtained in said calculating of distances to reach the second trajectory from the first trajectory.

5. The moving object detection method according to claim 4,
wherein said calculating of geodetic distances includes
(1) calculating a distance nonlinearized by transforming, into an infinite value, a part of the distances between the trajectories calculated in said calculating of distances, and (2) calculating, in calculating of the geodetic distance from the first trajectory to the second trajectory based on the non-linear distance, as one of the geodetic distances, the shortest path among all of the paths that pass through, as a relay point, another at least one of the trajectories to reach the second trajectory from the first trajectory.

6. The moving object detection method according to claim 1,
wherein said calculating of geodetic distances includes:
obtaining thresholds; and calculating a distance in a path which passes through trajectories in a neighborhood, for each of the thresholds, using the distances between the trajectories calculated in said calculating of distances, and using the obtained thresholds as the thresholds defining the neighborhood of the trajectories, so that the geodetic distances between the trajectories are calculated, and
said generating region candidates generates the region candidates by identifying a group of similar trajectories as one region candidate, based on the geodetic distance between the trajectories for each of the thresholds calculated in said calculating of geodetic distances.

7. The moving object detection method according to claim 6,
wherein said calculating of geodetic distances includes generating, as the thresholds, values between a maximum value and a minimum value among the distances calculated in said calculating of distances.

8. The moving object detection method according to claim 1,
wherein said calculating of interregional geodetic distances includes calculating, for each of the thresholds, interregional geodetic distances between two region candidates in a first set of region candidates among the region candidates generated in said generating region candidates, using a representative geodetic distance and a reference geodetic distance, the representative geodetic distance being a geodetic distance in the two region candidates and the reference geodetic distance being a geodetic distance in a second set of region candidates including region candidates by a total number next smaller to a total number of the region candidates included in the first set of region candidates.

9. The moving object detection method according to claim 8,
wherein in said calculating of interregional geodetic distances, the interregional geodetic distances are calculated by calculating an index value indicating a distance between the two region candidates and an index value indicating variation in each of the region candidates, based on the reference geodetic distance and the representative geodetic distance, and normalizing the index value indicating the distance, using the index value indicating the variation.

10. The moving object detection method according to claim 1,
wherein the interregional geodetic distances calculated in said calculating of interregional geodetic distances is a value obtained by normalizing an index value which indicates a distance between two region candidates and is calculated from a summation of geodetic distances between trajectories belonging to one region candidate and trajectories belonging to another region candidate, using an index value indicating variation in the region candidates calculated from a summation of geodetic distances between trajectories belonging to the one region candidate and an index value indicating variation in the region candidates calculated from a summation of geodetic distances between trajectories belonging to the other region candidate.

11. The moving object detection method according to claim 1,
wherein said selecting a region candidate includes selecting, from among the region candidates generated in said generating of region candidates, all of two region candidates having the interregional geodetic distance which is calculated in said calculating of interregional geodetic distances and which is greater than a predetermined threshold, and outputting the selected region candidates, as a result of the segmentation.

12. The moving object detection method according to claim 1,
wherein said selecting a region candidate includes selecting, from among the region candidates generated in said generating of region candidates, a region candidate based on a temporal change in the interregional geodetic distances calculated in said calculating of interregional geodetic distances, and outputting the selected region candidate as a result of the segmentation.

13. The moving object detection method according to claim 12,
wherein said selecting a region candidate includes selecting, from among the region candidates generated in said generating region candidates, two region candidates having interregional geodetic distances whose temporal change is greater than a predetermined threshold, as different regions, and outputting the selected region candidates as a result of the segmentation.

14. The moving object detection method according to claim 12, wherein said selecting a region candidate includes selecting, from among the region candidates generated in said generating of region candidates, two region candidates having interregional geodetic distances whose temporal change is smaller than a predetermined threshold, as a same region, and outputting the selected region candidates as a result of the segmentation.

15. The moving object detection method according to claim 12,
wherein said selecting a region candidate includes selecting, from among the region candidates generated in said generating of region candidates, a region candidate based on a temporal change in the interregional geodetic distances calculated in said calculating of interregional geodetic distances so that (1) two region candidates are more different as the temporal change in the interregional geodetic distances of the two candidates is greater and (2) two region candidates are more similar as the temporal change in the interregional geodetic distances of the two candidates is smaller, and outputting the selected region candidate as a result of the segmentation.

16. The moving object detection method according to claim 12,
wherein said calculating of distances and performing segmentation are repeatedly performed for a new video, and
said selecting a region candidate includes selecting, from among the region candidates generated in said generating of region candidates, all of two region candidates having the interregional geodetic distances which have been calculated in said calculating of interregional geodetic distances and which have temporal changes greater than a predetermined threshold, in said calculating of distances and performing segmentation performed repeatedly, as a result of the segmentation, and outputting the selected region candidates.

17. The moving object detection method according to claim 2,
wherein said generating of region candidates includes generating region candidates by generating images of the region candidates using brightness information of the images obtained in said capturing pictures and identifying at least one group of trajectories corresponding to the images of the region candidates.

18. The moving object detection method according to claim 1,
wherein the region candidates generated in said generating of region candidates includes at least one of the region candidates to which a single trajectory belongs, and
said calculating of interregional geodetic distances includes outputting, as an interregional geodetic distance between the at least one of the region candidates to which the single trajectory belongs and another region candidate, a geodetic distance of the single trajectory and a given one trajectory belonging to the other region candidate.

19. The moving object detection method according to claim 18,
wherein said selecting a region candidate includes identifying, as a same region, two trajectories having the geodetic distance between trajectories whose temporal change is smaller than a predetermined threshold, the geodetic distance having been output as the interregional geodetic distance.

20. The moving object detection method according to claim 18,
wherein said selecting a region candidate includes identifying, as different regions, two trajectories having the geodetic distance between trajectories whose temporal change is greater than a predetermined threshold, the geodetic distance having been output as the interregional geodetic distance.

21. The moving object detection method according to claim 2, further comprising
performing image processing on, and outputting, the video captured in said capturing pictures, so as to be displayed in a different mode for each of the regions identified in said performing segmentation.

22. The moving object detection method according to claim 1, further comprising
estimating a motion of the moving object by calculating, using trajectories included in the region identified in said performing segmentation, a representative trajectory that represents the region, and estimating that the region moves according to the representative trajectory that has been calculated.

23. A moving object detection apparatus which detects a moving object in video by performing segmentation on all or part of the moving object in the video, said moving object detection apparatus comprising:
a distance calculating unit configured to obtain trajectories each of which is a corresponding point between images included in the video, and to calculate distances each of which indicates similarity between the trajectories, for the obtained trajectories; and
a segmentation unit configured to perform segmentation by identifying a group of similar trajectories as one region, based on the distances calculated by said distance calculating unit,
wherein said segmentation unit includes:
a geodetic distance calculating unit configured to calculate geodetic distances between the trajectories using the distances between the trajectories that have been calculated by said distance calculating unit;
a region candidate generating unit configured to generate region candidates using the trajectories, each of the region candidates being a group of the trajectories;
an interregional geodetic distance calculating unit configured to calculate interregional geodetic distances, for the region candidates generated by said region candidate generating unit, based on the geodetic distances between the trajectories belonging to the region candidates, each of the interregional geodetic distances indicating similarity between the region candidates; and
a region candidate selecting unit configured to select, as a result of the segmentation, a region candidate having one of the interregional geodetic distances which is calculated by said interregional geodetic distance calculating unit and which satisfies a predetermined condition, from among the region candidates generated by said region candidate generating unit.

24. A program used in a moving object detection apparatus which detects a moving object in video by performing segmentation on all or part of the moving object in the video, said program causing a computer to execute:
the moving object detection method according to claim 1.

* * * * *